United States Patent
Moon et al.

(10) Patent No.: US 9,715,344 B2
(45) Date of Patent: Jul. 25, 2017

(54) MEMORY DEVICE AND CONTROLLING METHOD OF THE SAME

(71) Applicant: SAMSUNG ELECTRONICS CO., LTD., Suwon-si, Gyeonggi-do (KR)

(72) Inventors: Sang-Kwon Moon, Pyeongtaek-si (KR); Seung-Uk Shin, Seoul (KR); Kyung-Ho Kim, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 99 days.

(21) Appl. No.: 14/620,305

(22) Filed: Feb. 12, 2015

(65) Prior Publication Data

US 2015/0261452 A1 Sep. 17, 2015

(30) Foreign Application Priority Data

Mar. 12, 2014 (KR) ........................ 10-2014-0029268

(51) Int. Cl.
*G06F 3/06* (2006.01)
*G06F 12/02* (2006.01)

(52) U.S. Cl.
CPC .......... *G06F 3/0616* (2013.01); *G06F 3/0659* (2013.01); *G06F 3/0688* (2013.01); *G06F 12/0246* (2013.01); *G06F 2212/7205* (2013.01)

(58) Field of Classification Search
CPC .... G06F 3/0616; G06F 3/0688; G06F 3/0659; G06F 12/0246; G06F 12/0253; G06F 2212/7205
See application file for complete search history.

(56) References Cited

U.S. PATENT DOCUMENTS

| | | | |
|---|---|---|---|
| 7,437,557 B2 | 10/2008 | Lee et al. | |
| 8,032,724 B1 | 10/2011 | Smith | |
| 8,364,918 B1 | 1/2013 | Smith | |
| 8,386,700 B2 | 2/2013 | Olbrich et al. | |
| 8,402,242 B2 | 3/2013 | Hu et al. | |
| 8,499,010 B2 | 7/2013 | Gracie et al. | |
| 2008/0205157 A1* | 8/2008 | Seol | G11C 16/349 365/185.19 |
| 2008/0279005 A1* | 11/2008 | France | G06F 12/0246 365/185.11 |
| 2010/0287217 A1 | 11/2010 | Borchers et al. | |
| 2010/0306452 A1 | 12/2010 | Weber et al. | |
| 2011/0219248 A1 | 9/2011 | Cho et al. | |

(Continued)

FOREIGN PATENT DOCUMENTS

| | | |
|---|---|---|
| JP | 2002-318714 | 10/2002 |
| JP | 2004-133752 | 4/2004 |

(Continued)

*Primary Examiner* — Hiep Nguyen
(74) *Attorney, Agent, or Firm* — F. Chau & Associates, LLC

(57) ABSTRACT

A flash memory system is provided. The flash memory system includes a memory device including a memory cell array including at least one data block and a controller that determines whether to end background garbage collection according to a lifespan index of the at least one data block. The lifespan index may be decreased by the background garbage collection. The controller may end the background garbage collection when the decreased lifespan index is equal to or higher than a reference value.

17 Claims, 20 Drawing Sheets

(56) References Cited

U.S. PATENT DOCUMENTS

| | | |
|---|---|---|
| 2012/0117406 A1 | 5/2012 | Eun |
| 2012/0137006 A1 | 5/2012 | Minato et al. |
| 2012/0137101 A1 | 5/2012 | Arcese et al. |
| 2013/0060991 A1* | 3/2013 | Lee .................... G06F 12/0246 711/103 |
| 2013/0166824 A1 | 6/2013 | Shim et al. |
| 2014/0071756 A1* | 3/2014 | Iwai .................... H01L 27/1157 365/185.11 |

FOREIGN PATENT DOCUMENTS

| | | |
|---|---|---|
| JP | 2004-178417 | 6/2004 |
| JP | 2012-118834 | 6/2012 |
| KR | 1020000041918 | 7/2000 |
| KR | 1020060037793 | 5/2006 |
| KR | 1020090107098 | 10/2009 |
| KR | 1020100115090 | 10/2010 |
| KR | 1020140145254 | 12/2014 |

* cited by examiner

MEMORY DEVICE AND CONTROLLING METHOD OF THE SAME

CROSS-REFERENCE TO RELATED APPLICATION

This application claims priority to Korean Patent Application No. 10-2014-0029268, filed on Mar. 12, 2014, in the Korean Intellectual Property Office, the disclosure of which is incorporated by reference herein in its entirety.

BACKGROUND

Technical Field

The inventive concept relates to a memory system and a controlling method thereof, and more particularly, to a flash memory system which guarantees a predetermined lifespan and a controlling method thereof.

Discussion of Related Art

Flash memory is an electronic non-volatile computer storage medium that can be electrically erased and reprogrammed. Flash memory systems have been scaled down and the number of bits stored in each memory cell has increased, as the flash memory systems are required to be highly integrated. In addition, the amount of data that is processed in memory devices or memory systems has been increasing. As a result, an improvement of data processing speed is required.

SUMMARY

At least one embodiment of the inventive concept provides a flash memory system which prevents an unnecessary decrease in the lifespan thereof even while performing background garbage collection or read reclaim and improves user satisfaction regarding the performance thereof, and a method of controlling the flash memory system.

At least one embodiment of the inventive concept provides a flash memory system which guarantees a predetermined lifespan even while performing background garbage collection, and a method of controlling the flash memory system.

According to an exemplary embodiment of the inventive concept, there is provided a non-volatile memory system including: a memory device including a memory cell array; and a controller which controls a background operation with respect to the memory device and determines whether to end the background operation according to whether a first control command received from a host requires a quick processing.

The background operation may include at least one selected from background garbage collection, erasing, read reclaim, and status checking of the memory cell array.

The controller may determine whether the received command requires the quick processing by identifying information included in the first control command.

The controller may determine whether the received command requires the quick processing via information received from an interface connected with the host.

The first control command may include information about how fast the command requires to be processed, and the controller may determine whether to end the background operation according to the information about how fast the first control command needs to be processed.

The controller may transmit information of whether a memory device performs the background operation to the host. In an exemplary embodiment, the host stores the information as a bit signal, and when a request by a user, which does not require a quick response, is input into the host, the host delays processing of the request of the user.

The controller may transmit information about how much time is needed to process the background information to the host.

The host may determine that the command transmitted to the controller does not requires the quick processing, when there is no input to the host for a predetermined time or when a screen of a display device including the flash memory system is off for a predetermined time.

The controller may determine that the first control command does not require the quick processing, when there is no input to the host for a predetermined time.

The controller may process the first control command received from the host after the background operation is completed.

The controller may store a bit signal related to the information about whether the first control command requires the quick processing.

According to an exemplary embodiment of the inventive concept, there is provided a method of controlling a memory system including a controller and a memory device, the method including: receiving a first control command with respect to the memory device from a host; determining whether the controller performs a background operation; and determining whether the first control command requires a quick processing.

The method may further include determining whether to end the background operation according to whether the first control command requires the quick processing.

The background operation may include at least one selected from background garbage collection, erasing, read reclaim, and status checking of the memory cell array.

The method may include processing the first control command received from the host after the background operation is completed.

According to an exemplary embodiment of the inventive concept, there is provided a flash memory system including: a memory device including a memory cell array including at least one data block including a plurality of nonvolatile memory cells; and a controller that determines whether to end background garbage collection according to a lifespan index of the at least one data block.

In an exemplary embodiment, the plurality of nonvolatile memory cells forms a three-dimensionally stacked memory cell structure. In an exemplary embodiment, the memory cell array includes $Si_3N_4$ as a charge trap layer.

In an exemplary embodiment, the lifespan index is decreased by the background garbage collection, and the controller ends the background garbage collection, when the decreased lifespan index is equal to or higher than a first reference value.

The controller may calculate the lifespan index and calculate the first reference value according to the lifespan index.

The controller may determine the lifespan index based on a programming/erasing count with respect to the at least one data block. The controller may determine the lifespan index in correspondence to a programming/erasing count with respect to a page included in the data block.

The controller may determine the lifespan index based on an accumulated amount of data bits programmed into the at least one data block. The controller may determine the lifespan index in correspondence to an accumulated amount of data bits programmed in a page included in the data block.

The controller may determine the lifespan index per iteration of the background garbage collection.

The controller may output to the outside the lifespan index calculated per iteration of the background garbage collection. The output may be provided to a source located outside the flash memory system.

The controller may determine whether to end the background garbage collection in correspondence to whether the number of free blocks obtained from each iteration is equal to or higher than a second reference value.

The controller may determine whether to end the background garbage collection based on whether a time taken for each iteration is equal to or higher than a third reference value.

In an exemplary embodiment, the controller copies data stored in a first data block through an $n^{th}$ data block among the at least one data block in an $m^{th}$ data block which is a free data block, and erases the data stored in the first data block through the $n^{th}$ data block to make the first data block through the $n^{th}$ data block free blocks.

The controller may receive from the host a lifespan index which is allowed to be decreased by the memory device for the background garbage collection.

According to an exemplary embodiment of the inventive concept, there is provided a method of controlling a flash memory system, the method including: determining whether background garbage collection is performed with respect to a memory device; calculating a lifespan index of a data block included in the memory device; and determining whether to end the background garbage collection in correspondence to the lifespan index.

The method may include ending the background garbage collection when the lifespan index which decreases by the background garbage collection, is equal to or higher than a first reference value.

The method may include determining the lifespan index in correspondence to a programming/erasing count with respect to a page included in the data block.

The method may include calculating the lifespan index per iteration of the background garbage collection.

The method may further include determining whether to end the background garbage collection in correspondence to whether the number of free blocks obtained from each iteration is equal to or higher than a second reference value.

According to an exemplary embodiment, a mobile device is provided. The mobile device includes a memory system. The memory system includes a memory device and a controller. The memory device includes a memory cell having a plurality of data blocks. The memory controller is configured to periodically execute an operation to copy data from N of the data blocks to M of the other data blocks and delete contents of the N data blocks, until the controller determines that a remaining life of the memory device is below a threshold. The N and M are natural numbers and N is greater than M.

The controller may be configured to perform the periodic execution after a screen of the mobile device has been turned off. In an exemplary embodiment, after the controller determines that the remaining life of the memory device is below the threshold, upon receipt of a request from a host to perform the operation, the controller ignores the request. In an exemplary embodiment, the controller ends the periodic execution of the operation when the remaining life is not below the threshold and a number of free blocks obtained from the execute of the operation exceeds another threshold. In an exemplary embodiment, the controller ends the periodic execution of the operation when the remaining life is not below the threshold and the execution and a number of free blocks obtained from the execute of the operation exceeds another threshold. In an exemplary embodiment, the controller ends the periodic execute of the operation when the remaining life is not below the threshold and the execution takes an amount of time that exceeds another threshold.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION

Figure 1:
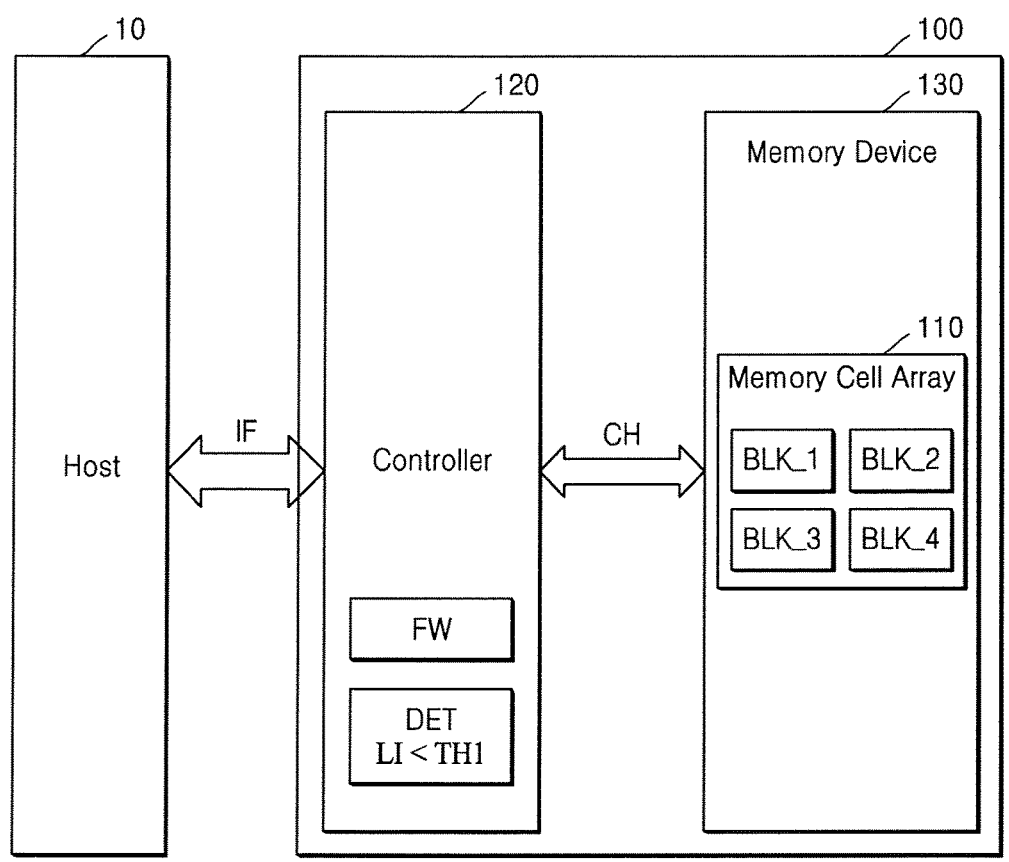
FIG. 1 is a diagram of a structure of a flash memory system using methods of controlling a flash memory system, according to exemplary embodiments of the inventive concept.

The inventive concept will now be described more fully with reference to the accompanying drawings, in which exemplary embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the inventive concept. Like reference numerals in the drawings denote like elements, and thus their description will be omitted. In the drawings, the thicknesses of layers and regions maybe exaggerated for clarity. As used herein, the singular forms "a," "an", and "the", are intended to include the plural forms as well, unless the context clearly displays otherwise.

Semiconductor memory devices may be divided into volatile memory devices, such as dynamic random-access memory (DRAM) and static random-access memory (SRAM), and non-volatile memory devices, such as electrically erasable programmable read-only memory (EEPROM), ferroelectric random-access memory (FRAM), phase-change memory (PRAM), magnetoresistive random-access memory (MRAM), and flash memories. The volatile memory devices lose stored data when power is blocked, but the non-volatile memory devices may retain data when power is blocked. Flash memories have high programming speeds, low power consumption, and large data capacity, and thus are widely used as storage media of computing systems.

FIG. 1 is a diagram of a memory system 100 using methods of controlling a memory system according to exemplary embodiments of the inventive concept.

Referring to FIG. 1, the memory system 100 includes a controller 120 and a memory device 130. The memory device 130 includes a memory cell array 110 composed of non-volatile memories, such as flash memories. The controller 120 is configured to control the memory device 130.

According to an exemplary embodiment of the inventive concept, the memory cell array 110 is composed of NAND flash memories. However, the non-volatile memories included in the memory cell array 110 are not limited to specific types and forms, and may include various types and forms. Although it is illustrated in this specification that the memory device 130 includes one memory cell array 110, the memory device 130 may include one or more memory cell arrays 110 according to various applications.

The number of data bits stored in each memory cell of the memory cell array 110 may vary. For example, flash memories may be formed as single-bit cells or single-level cells (SLCs) that store 1-bit data in one memory cell, or as multi-bit cells, multi-level cells (MLCs), or multi-state cells that store multi-bit data (for example 2 bits or more) in one memory cell. The MLCs allow for the high integration of memories.

The memory cell of the memory cell array 110 may include various forms of charge storage layers. For example, a charge storage layer of a flash memory cell may be formed of polycrystalline silicon having conductivity, or may be formed by using an insulating layer, such as $Si_3N_4$, $Al_2O_3$, HfAlO, and HfSiO.

The memory cell array 110 may include at least one data block BLK_1, BLK_2, BLK_3, or BLK_4. Although it is illustrated in this specification that the memory cell array 110 includes four data blocks BLK_1, BLK_2, BLK_3, and BLK_4, the number of data blocks included in the memory cell array 110 may be changed according to an application in which the memory cell array 110 is implemented.

Here, the at least one data block BLK_1, BLK_2, BLK_3, or BLK_4 may include, for example, at least one page of a non-volatile memory device. Also, the data blocks BLK_1, BLK_2, BLK_3, and BLK_4 may be any type of spaces, in which data stored in the non-volatile memory device is written.

The data blocks BLK_1, BLK_2, BLK_3, and BLK_4 may be divided into a valid data block (for example, data blocks BLK_1 and BLK_2) in which data is written, the written data being available for use, an invalid data block (for example, data block BLK_3) in which data is written, the written data not being available for use, and a free data block (for example, data block BLK_4) in which no data is written.

The controller 120 may receive or transmit data from/to a host 10 via one interface selected from universal serial bus (USB), multimediacard (MMC), peripheral component interconnect express (PCI-E), advanced technology attachment (ATA), serial advanced technology attachment (SATA), parallel advanced technology attachment (PATA), serial attached small computer system (SAS), small computer system interface (SCSI), embedded multi-media card (eMMC), and enhanced small disk interface (ESDI). An interface between the controller 120 and the host 10 may be performed by a host interface provided in the controller 120.

The controller 120 controls writing, erasing, and reading operations of the memory cell array 110 in response to a command input from the host 10. For example, the controller 120 may perform an operation of writing data that is dispersedly written in a number of blocks of the memory cell array 110 in one free block, by receiving a garbage collection command from the host 10.

The controller 120 may operate by just firmware FW mounted on the controller 120. For example, the controller 120 may perform background garbage collection, when a screen off status continues for a predetermined time period. For example, if the memory system is located in a smartphone, the screen off status may occur when the smartphone blanks the screen due to non-use. The background garbage collection may denote garbage collection that is performed as determined by the controller 120 when there is no request for garbage collection from the host 10.

The controller 120 may perform the garbage collection operation of the memory cell array 110. In an exemplary embodiment, the controller 120 copies data written in the valid data blocks (data blocks BLK_1 and BLK_2) into the free data block (data block BLK_4) and erases the data stored in the valid data blocks (data blocks BLK_1 and BLK_2) to make the valid data blocks (data blocks BLK_1 and BLK_2) free blocks. For example, if only 50% of data block BLK_1 and only 50% of data block BLK_2 is currently occupied with data, the contents of both data blocks BLK_1 and BLK_2 can be combined for storage into a single block BLK_4, to free up two separate data blocks.

In an exemplary embodiment, the controller 120 copies data written in first to $n^{th}$ valid data blocks into $1^{st}$ to $m^{th}$ free data blocks and erases the data written in the first to $n^{th}$ valid data blocks to make the first to $n^{th}$ valid blocks the free blocks. In an exemplary embodiment 'n' and 'm' are natural numbers and 'm' is less than 'n'. The controller 120 may repeat an operation that performs the background garbage collection a number of times.

Throughout this specification, an iteration of the garbage collection may denote a cycle of operations of copying the data written in the first to $n^{th}$ valid data blocks into the first to $m^{th}$ free data blocks and erasing the data written in the first to $n^{th}$ valid data blocks. For example, if each cycle is 1 millisecond (ms), and 10 iterations of garbage collection have been performed, garbage collection has been performed for the last 10 ms. However, the time period of the cycle may vary.

The controller 120 included in the memory system 100 according to an exemplary embodiment continually performs the background garbage collection and calculates a lifespan index of each data block BLK_1, BLK_2, BLK_3, or BLK_4 included in the memory cell array 110.

In this specification, the lifespan index may denote a time period during which a normal operation of the memory system 100 or the memory device 130 is guaranteed to a user.

For example, the lifespan index may be indicated by using the number of program/erase (P/E) cycles. That is, the lifespan index may be indicated by the number of P/E cycles during which a normal operation of the memory system 100 or the memory device 130 is guaranteed to a user.

For example, the lifespan index may be indicated by using the number of programs. That is, the lifespan index may be indicated by the number of programs during which the normal operation of the memory system 100 or the memory device 130 is guaranteed to the user.

For example, the lifespan index may be indicated by using the number of accumulated bits of programmed data. That is, the lifespan index may be indicated by the number of accumulated bits of programmed data at which the normal operation of the memory system 100 or the memory device 130 is guaranteed to the user.

For example, the lifespan index may be indicated by using an equation generated by at least one selected from the number of P/E cycles, the number of programs, and the number of accumulated bits of programmed data.

The controller 120 may determine whether to end the background garbage collection according to the lifespan index of the at least one data block. The controller 120 may continually calculate the remaining lifespan index of the data blocks. Also, the controller 120 may calculate the lifespan index which is to be decreased per iteration of the background garbage collection. Also, the controller 120 may determine a lifespan index (a first reference value) which is allowed to be decreased by the background garbage collection, by considering the total lifespan index and the remaining lifespan index per iteration of the background garbage collection.

The controller 120 may include a determination unit DET that determines whether to end the background garbage collection per iteration, according to the lifespan index of the data blocks. In an exemplary embodiment, the determination unit DET determines whether the remaining lifespan index of the data blocks is greater than the lifespan index (the first reference value) which is allowed to be decreased by the background garbage collection and determines whether to end the background garbage collection, per iteration.

For example, the determination unit DET may enable the controller 120 to end the background garbage collection, when the remaining lifespan index (e.g., LI) of the data blocks is smaller than the lifespan index (the first reference value or TH1) which is allowed to be decreased by the background garbage collection.

In an exemplary embodiment, the controller 120 receives from the host 10 the lifespan index (the first reference value) which is allowed to be decreased by the background garbage collection, per iteration.

The controller 120 may calculate the lifespan index (the first reference value) which is allowed to be decreased by the background garbage collection by the firmware FW, per iteration.

The controller 120 may maintain constant the lifespan index which is consumed by an iteration of the background garbage collection.

When the lifespan index of the data blocks is not set, in an exemplary embodiment, the controller 120 does not perform the background garbage collection even when the controller 120 receives a command for performing the background garbage collection from the host 10. For example, the controller 120 may ignore the command requesting performance of the background garbage collection.

When the lifespan index of the data blocks is expanded by an optimization method (for example, host aware write mode control), the controller 120 may perform the background garbage collection within a degree at which the background garbage collection decreases the expanded lifespan index, compared to the lifespan index which is decreased by the background garbage collection.

The controller 120 may define a lifespan index decreased by the background garbage collection in a unit of a predetermined time interval. For example, when several seconds or minutes have passed since the background garbage collection started and the background garbage collection was performed more than k times, in an exemplary embodiment, the controller 120 may not perform the background garbage collection anymore and ends the background garbage collection.

The controller 120 may define a lifespan index decreased by the background garbage collection in a unit of a predetermined amount of writing (or programming). For example, in the case where the background garbage collection was started and a predetermined number of kbytes were written, in an exemplary embodiment, the controller 120 may no longer perform the background garbage collection and ends the background garbage collection when the background garbage collection was performed more than k times while the predetermined number kbytes were written.

As shown above, in the memory system 100 according to an exemplary embodiment, the controller 120 determines whether to continue performing the background garbage collection according to the lifespan index of the memory cell array 110, thereby guaranteeing a predetermined lifespan of the memory system 100 while performing the background garbage collection.

Figure 2:
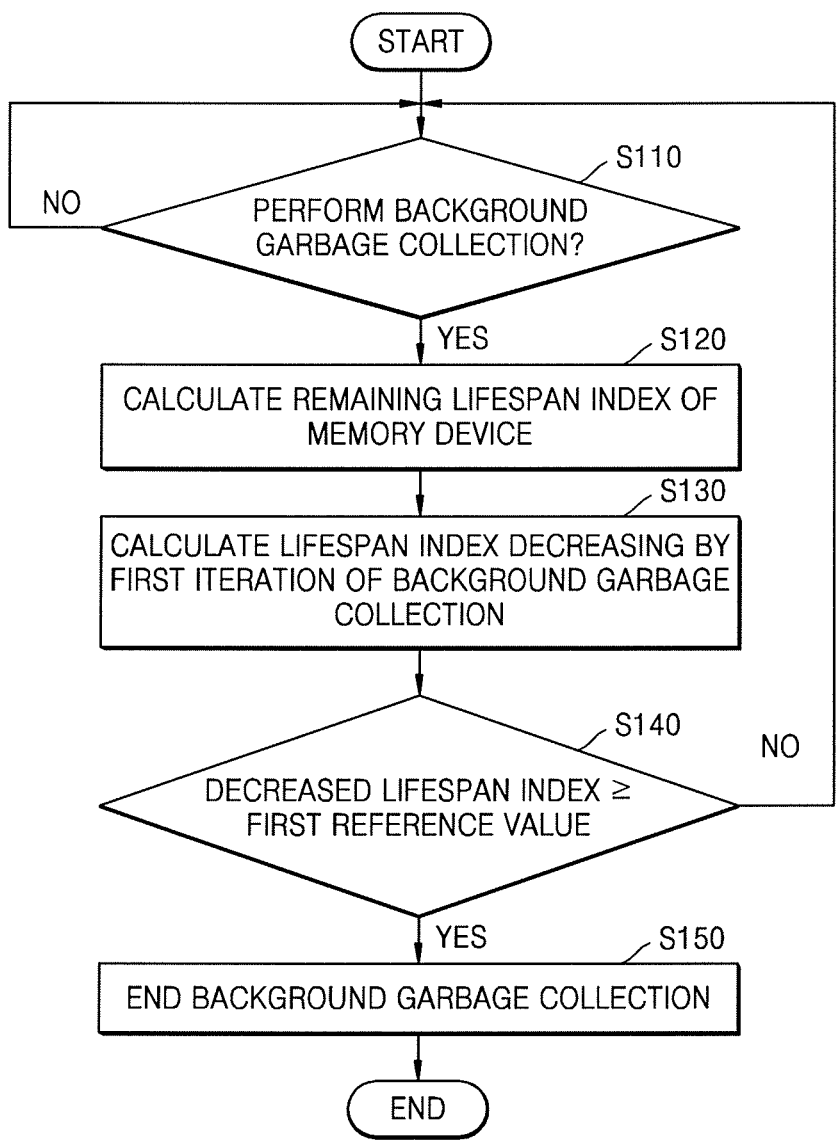
FIG. 2 is a flowchart of a method of controlling the flash memory system of FIG. 1, according to an exemplary embodiment of the inventive concept.

FIG. 2 is a flowchart of a method of controlling the memory system 100 of FIG. 1, according to an exemplary embodiment of the inventive concept.

Referring to FIG. 2, when the controller 120 performs the background garbage collection in operation S110, the controller 120 calculates the remaining lifespan index of the memory device 130 in operation S120. Here, the method of calculating the lifespan index may be based on at least one selected from the number of P/E cycles, the number of programs, and the number of accumulated bits of programmed data. The remaining lifespan index may be a number indicating a time period during which a normal operation of the memory system 100 or the memory device 130 is guaranteed to a user from the starting point of calculation.

The controller 120 calculates the lifespan index which decreases by an iteration of the background garbage collection, in operation S130. Here, the lifespan index, which decreases, may refer to a lifespan index which decreases by a first iteration.

When the lifespan index, which decreases, is equal to or higher than a first reference value in operation S140, the controller 120 ends the background garbage collection with respect to the first iteration in operation S150.

Assume the controller 120 is continuously performing garbage collection with respect to memory device 130, and at time 1, has executed a first garbage collection operation. Assume further, the remaining lifespan of the memory device is 60,000 writes/erases. If the first garbage collection operation resulted in 1000 writes/erases, the remaining life span can be decreased to 59,000 writes/erases. Assume further, that a first reference value of 50,000 writes/erases is present. Since 59,000 is greater than the first reference value, the controller 120 continues to perform garbage collection. Assume next at time 2, the controller 120 has executed a second garbage collection operation. If the second garbage collection operation resulted in 10,000 writes/erases, the remaining life span can be decreased to 49,000 writes/erases. Since the 49,000 is less than 50,000, the controller 120 stops performing background garbage collection with respect to the memory cell array 110.

At least one exemplary embodiment of a method of controlling the memory system 100 may be performed by the controller 120 of FIG. 1 through a computer program that performs a method of controlling a flash memory device, or by firmware (F/W) through which the program is written.

Figure 3:
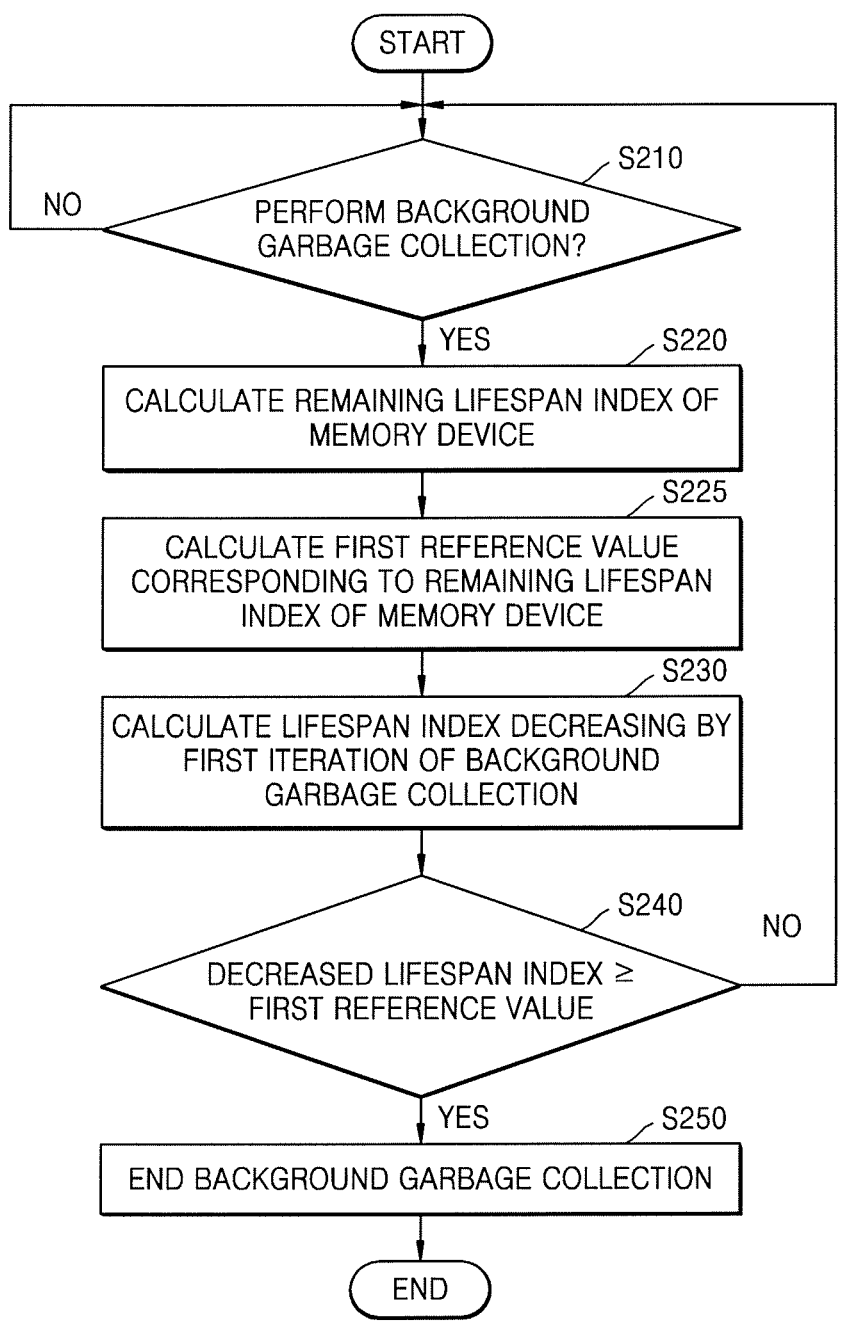
FIG. 3 is a flowchart of a method of controlling the flash memory system of FIG. 1, according to an exemplary embodiment of the inventive concept.

FIG. 3 is a flowchart of a method of controlling the memory system 100 of FIG. 1, according to an exemplary embodiment of the inventive concept.

Referring to FIG. 3, when the controller 120 performs the background garbage collection in operation S210, the controller 120 calculates the remaining lifespan index of the memory device 130 in operation S220. The controller 120 calculates the first reference value corresponding to the remaining lifespan index of the memory device 130, in operation S225.

Also, the controller 120 calculates the lifespan index which decreases by the first iteration of the background garbage collection, in operation S230.

When the lifespan index, which decreases, is equal to or higher than the first reference value in operation S240, the controller 120 ends the background garbage collection with respect to the first iteration in operation S250.

For example, rather than having a constant first reference value, it can be based on the remaining lifespan of the memory device 130. In another embodiment, the first reference value is based on the original lifespan of the memory device. For example, the first reference value can be some percentage of the original lifespan. For example, if the percentage is 50%, a first memory device has a lifespan of 1 million writes/erases, a second memory device has lifespan of 2 million writes/erases, then the first reference value for the first memory device would be 500,000 and the first reference value for the second memory device would be 1 million.

As shown above, according to the method of controlling the memory system 100, according to at least one exemplary embodiment, reference values may be set to be different based on the remaining lifespan index or the original lifespan, and thus, the controller 120 may flexibly end the background garbage collection according to the use of flash memories.

Figure 4:
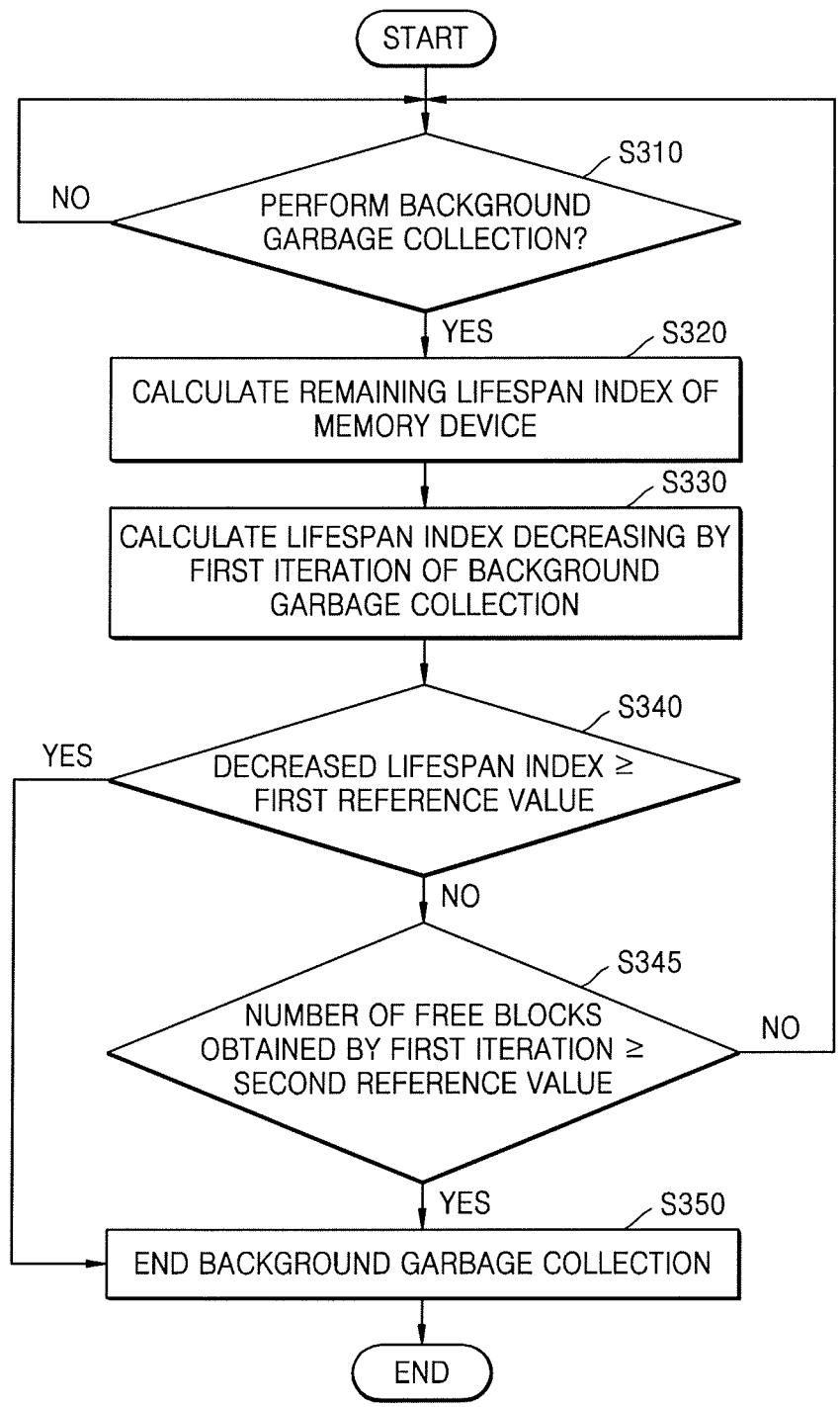
FIG. 4 is a flowchart of a method of controlling the flash memory system of FIG. 1, according to an exemplary embodiment of the inventive concept.

FIG. 4 is a flowchart of a method of controlling the memory system 100 of FIG. 1, according to an exemplary embodiment of the inventive concept.

Referring to FIG. 4, when controller 120 performs the background garbage collection in operation S310, the controller 120 calculates the remaining lifespan index of the memory device 130 in operation S320. According to other embodiments, the controller 120 may calculate the first reference value corresponding to the remaining lifespan index or the original lifespan of the memory device 130.

Also, the controller 120 calculates the lifespan index which decreases by the first iteration of the background garbage collection in operation S330.

When the lifespan index, which decreases, is equal to or higher than the first reference value in operation S340, the controller 120 ends the background garbage collection before the first iteration in operation S350. Even if the lifespan index, which decreases, is less than the first reference value, the controller 120 ends the background garbage collection before the first iteration in operation S350 when the number of free blocks obtained by the first iteration is equal to or higher than a second reference value in operation S345. For example, if the lifespan index is greater than the first reference value, and a current background garbage collection operation has created 1000 free blocks, and the second reference value is 1000 blocks or less, the background garbage collection by the controller 120 would end.

As shown above, according to the method of controlling the memory system 100, according to at least one exemplary embodiment, an additional mechanism for ending the background garbage collection is provided to prevent a decrease in the guaranteed lifespan of a flash memory due to excessive background garbage collection.

Figure 5:
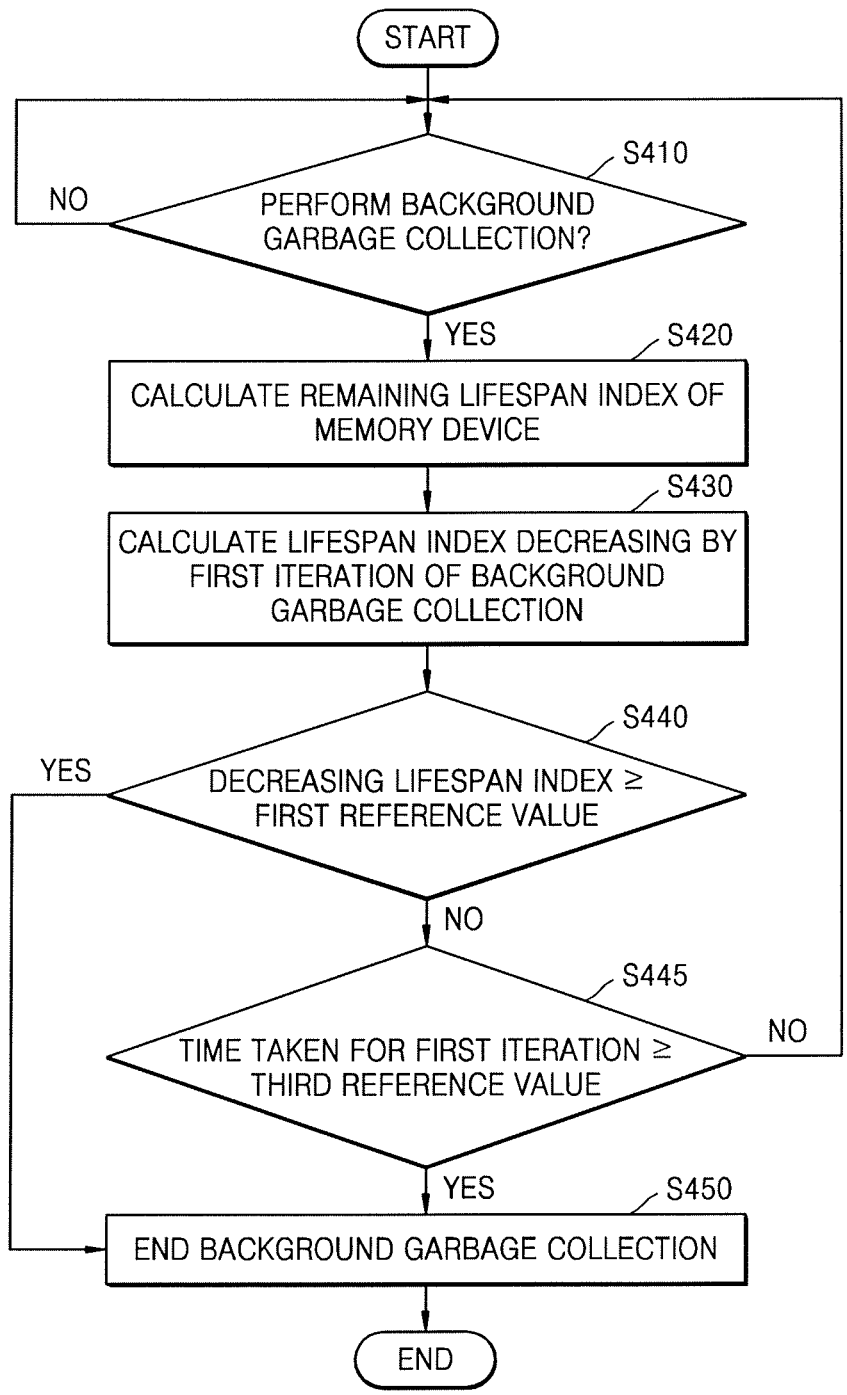
FIG. 5 is a flowchart of a method of controlling the flash memory system of FIG. 1, according to an exemplary embodiment of the inventive concept.

FIG. 5 is a flowchart of a method of controlling the memory system 100 of FIG. 1, according to an exemplary embodiment of the inventive concept.

Referring to FIG. 5, when the controller 120 performs the background garbage collection in operation S410, the controller 120 calculates the remaining lifespan index of the memory device 130 in operation S420. According to other exemplary embodiments, the controller 120 may calculate the first reference value corresponding to the remaining lifespan index or the original lifespan of the memory device 130.

Also, the controller 120 calculates the lifespan index which decreases by the first iteration of the background garbage collection, in operation S430.

When the lifespan index, which decreases, is equal to or higher than the first reference value in operation S440, the controller 120 ends the background garbage collection before the first iteration in operation S450. Even if the lifespan index, which decreases, is less than the first reference value, the controller 120 ends the background garbage collection before the first iteration in operation S450 when the time taken for the first iteration is equal to or higher than a third reference value in operation S445. For example, if the lifespan index is greater than the first reference value, and a current background garbage collection operation has taken 500 ms, and the third reference value is 500 ms or less, the background garbage collection by the controller 120 would end.

As shown above, according to the method of controlling the memory system 100, according to at least one exemplary embodiment, an additional mechanism for ending the background garbage collection is provided to prevent a decrease in the guaranteed lifespan of a flash memory due to excessive background garbage collection.

Figure 6:
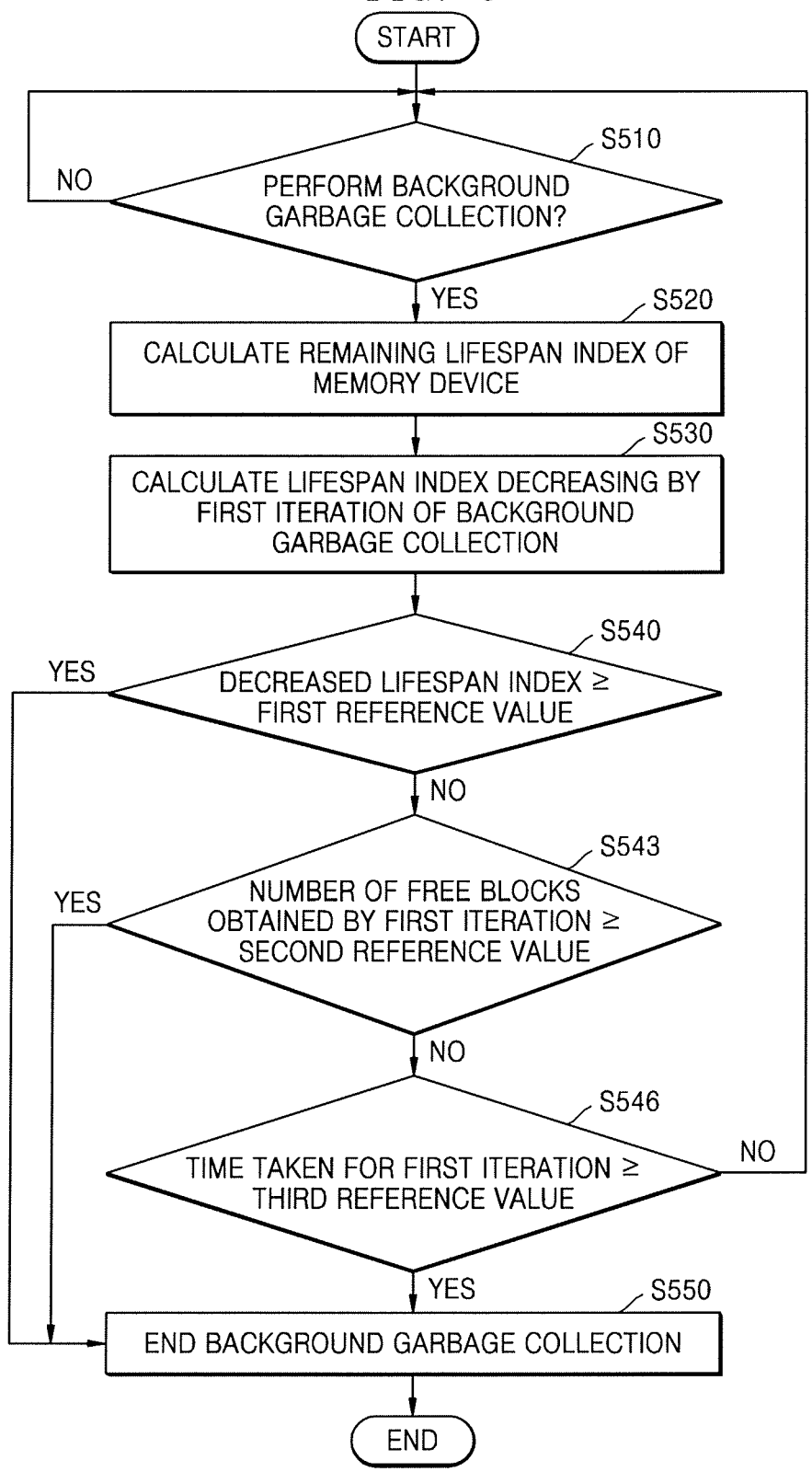
FIG. 6 is a flowchart of a method of controlling the flash memory system of FIG. 1, according to an exemplary embodiment of the inventive concept.

FIG. 6 is a flowchart of a method of controlling the memory system 100 of FIG. 1, according to an exemplary embodiment of the inventive concept.

Referring to FIG. 6, when the controller 120 performs the background garbage collection in operation S510, the controller 120 calculates the remaining lifespan index of the memory device 130 in operation S520. According to other exemplary embodiments, the controller 120 may calculate the first reference value corresponding to the remaining lifespan index or the original lifespan of the memory device 130.

Also, the controller 120 calculates the lifespan index which decreases by the first iteration of the background garbage collection in operation S530.

When the lifespan index, which decreases, is equal to or higher than the first reference value in operation S540, the controller 120 ends the background garbage collection before the first iteration in operation S550. Even if the lifespan index, which decreases, is less than the first reference value, the controller 120 ends the background garbage collection before the first iteration in operation S550 when the number of free blocks obtained by the first iteration is equal to or higher than the second reference value in operation S543. Also, even if the lifespan index, which decreases, is less than the first reference value and the number of free blocks obtained by the first iteration is less than the second reference value, the controller 120 ends the background garbage collection before the first iteration in operation S550 when the time taken for the first iteration is equal to or higher than a third reference value in operation S546.

As shown above, according to the method of controlling the memory system 100, according to at least one exemplary embodiment, an additional mechanism for ending the garbage collection is provided to prevent a decrease in the guaranteed lifespan of a flash memory due to excessive background garbage collection.

Figure 7:
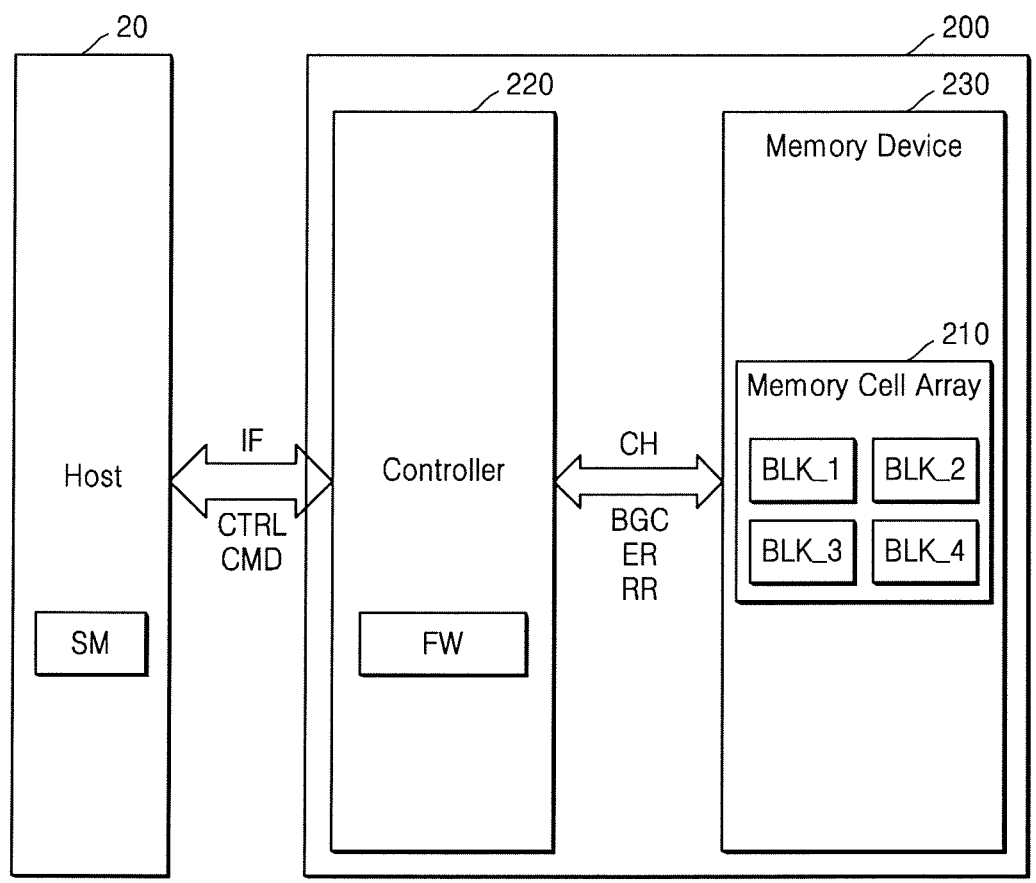
FIG. 7 is a diagram of a structure of a memory system using methods of controlling a memory system, according to exemplary embodiments of the inventive concept.

FIG. 7 is a diagram of a structure of a memory system 200 using methods of controlling a memory system, according to exemplary embodiments of the inventive concept.

Referring to FIG. 7, the memory system 200 includes a controller 220 and a memory device 230. The memory device 230 includes a memory cell array 210 composed of non-volatile memories, such as flash memories. The controller 220 may be configured to control the memory device 230. The memory system 200 may be mounted on mobile devices, such as cellular phones and tablet PCs.

According to an exemplary embodiment of the inventive concept, the memory cell array 210 is formed of NAND flash memories. The non-volatile memories included in the memory cell array 210 are not limited to specific types and forms and may include various types and forms. Although it is illustrated that the memory device 230 includes one memory cell array 210, the memory device 230 may include one or more memory cell arrays 210 according to various applications.

The number of data bits stored in each memory cell of the memory cell array 210 may vary. For example, the memory cell array 210 may be formed as single-bit cells or SLCs that store 1-bit data in one memory cell, or as MLCs, or multi-state cells that store multi-bit data (for example 2 bits or more) in one memory cell. The MLCs all for the high integration of memories.

The memory cells of the memory cell array 210 may include various forms of charge storage layers. For example, a charge storage layer of a flash memory cell may be formed of polycrystalline silicon having conductivity, or may be formed by using an insulating layer, such as $Si_3N_4$, $Al_2O_3$, HfAlO, and HfSiO.

The controller 220 may receive or transmit data from/to a host 20 via one selected from various interfaces, such as USB, MMC, PCI-E, ATA, SATA, PATA, SAS, SCSI, eMMC, and ESDI. An interface between the controller 220 and the host 20 may be performed by a host interface provided in the controller 220.

The controller 220 may control writing, erasing, and reading operations of the memory cell array 210 in response to a command input from the host 20. For example, the controller 220 may perform various operations with respect to the memory cell array 210, by receiving a control command from the host 20. For example, the controller 220 may receive the control command from the host 20 and perform garbage collection, erasing of free blocks, read reclaim, and status checking of memory cells, with respect to the memory cell array 210. For example, if data has become corrupted in one memory area, the valid portions of that one memory area that remain can be reclaimed (i.e., read reclaimed) by moving them to another memory area.

The controller 220 may perform various background operations by just firmware FW mounted on the controller 220. For example, the controller 220 may perform background garbage collection by the mounted firmware FW, when a screen off status continues for a predetermined time period. The background garbage collection may denote garbage collection that is performed as determined by the controller 220 when there is no request for garbage collection from the host 20.

In an exemplary embodiment, the controller 220 performs the garbage collection operation of the memory cell array 210. For example, the controller 120 copies data written in valid data blocks (data blocks BLK_1 and BLK_2) into a free data block (data block BLK_4) and erases the data stored in the valid data blocks (data blocks BLK_1 and BLK_2) to make the valid data blocks (data blocks BLK_1 and BLK_2) free blocks.

Also, the controller 220 copies data written in first to $n^{th}$ valid data blocks into $1^{st}$ to $m^{th}$ free data blocks and erases the data written in the first to $n^{th}$ valid data blocks to make the first to $n^{th}$ valid blocks free blocks. In an exemplary embodiment, n and m are natural numbers and m is less than n. The controller 220 may repeat the background garbage collection a certain number of times.

The controller 220, according to an exemplary embodiment, transmits status information of the memory system 200 to the host 20. For example, the controller 220 may transmit the status information of whether the memory system 200 performs the background operation to the host 20. For example, the controller 220 may transmit to the host 20 information about the time needed to complete the background operation performed by the memory system 200.

The host 20 may include a storage manager SM. The storage manager SM may manage information about whether a control command CTRL CMD issued from the host 20 requires a quick processing.

The storage manager SM may manage the information about whether the control command CTRL CMD issued from the host 20 requires the quick processing as bit information. When a request by a user generating the control command CTRL CMD does not require the quick processing, the storage manager SM may delay the request by the user.

For example, the storage manager SM may manage information about how fast the control command CTRL CMD issued from the host 20 needs to be processed. For example, the storage manager SM may manage the information about how fast the control command CTRL CMD issued from the host 20 needs to be processed by dividing the control command CTRL CMD into different steps. For example, the storage manager SM may manage the information about how fast the control command CTRL CMD issued from the host 20 needs to be processed by dividing the control command CTRL CMD into reading, programming, and erasing steps. For example, the storage manager SM may manage the information about how fast the control command CTRL CMD issued from the host 20 needs to be processed as a bit signal.

The storage manager SM may determine whether the control command CTRL CMD issued from the host 20 requires a quick processing.

When there is no input to the host 20 for a predetermined time, the storage manager SM may determine that the command transmitted to the controller 220 does not require the quick processing. The storage manager SM may determine that the command transmitted to the controller 220 does not require the quick processing, when a screen of a display device (not shown), including the memory system 200, is off for a predetermined time. Hereinafter, an operation of the memory system 200 will be described with reference to FIG. 8.

Figure 8:
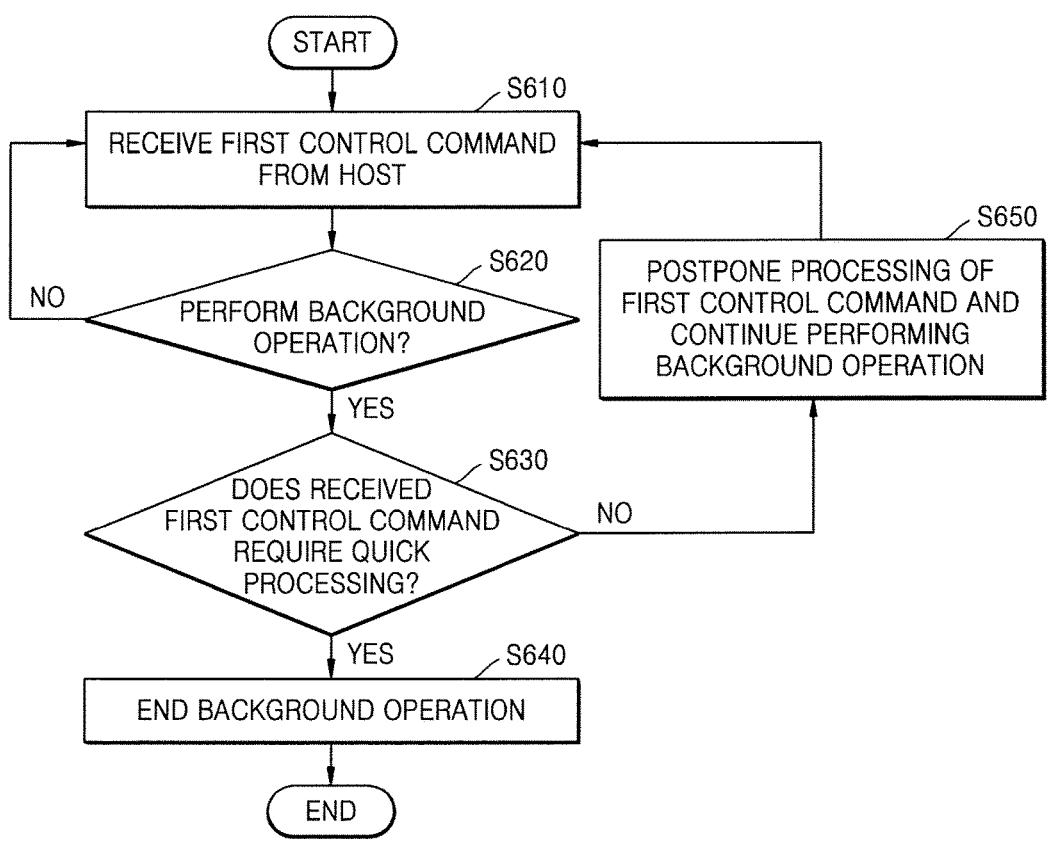
FIG. 8 is a flowchart of an operation of a memory system according to an exemplary embodiment of the inventive concept.

FIG. 8 is a flowchart of an operation of the memory system 200 of FIG. 2, according to an exemplary embodiment of the inventive concept.

Referring to FIG. 8, the host 20 may generate a control command CTRL CMD with respect to an operation of the memory system 200. For example, the host 20 may generate the control command CTRL CMD with respect to reading, programming, and erasing operations of the memory system 200. For example, the host 20 may generate the control command CTRL CMD with respect to garbage collection and read reclaim operations of the memory system 200.

The storage manager SM included in the host 20 may determine whether a generated first control command requires a quick processing. For example, the storage manager SM may determine whether a generated read command for the memory system 200 requires the quick processing. The determination result of the storage manager SM may be included in the read command and transmitted to the controller 220. The determination result of the storage manager SM may be transmitted to the controller 220 via an interface other than an interface via which the read command is transmitted.

The controller 220 receives the first control command (for example, the read command) from the host 20, in operation S610. When receiving the first control command (for example, the read command), the controller 220 determines whether the controller 220 performs at least one background operation, in operation S620. For example, the controller 220 may determine whether the controller 220 performs background garbage collection, read reclaim, erasing, or status checking of memory cells.

In this specification, a background operation may denote operations such as background garbage collection, erasing, read reclaim, and status checking of memory cells that may be performed by the memory system when there is no request by a user or the host.

When the controller 220 performs at least one background operation, the controller 220 determines whether the received first control command requires a quick processing, in operation S630.

If the received first control command requires the quick processing, the controller 220 ends an on-going background operation, in operation S640. Otherwise, if the received first control command does not require the quick processing, the controller 220 postpones (e.g., delays) processing of the first control command and continues performing the background operation, in operation S650. When the background operation is completed, the controller 220 may perform the postponed processing of the first control command. The operations described above may be performed by the firmware FW included in the controller 220. More detailed operations of the memory system 200 will be described by referring to FIGS. 8 through 11.

As discussed above, the memory system 200 according to an exemplary embodiment may determine whether to continue performing the background operation according to whether the first control command received by the controller 220 requires a quick processing, thereby guaranteeing a predetermined lifespan of the memory system 200 while performing background operations and improving user satisfaction regarding the performance of the memory system 200.

Figure 9:
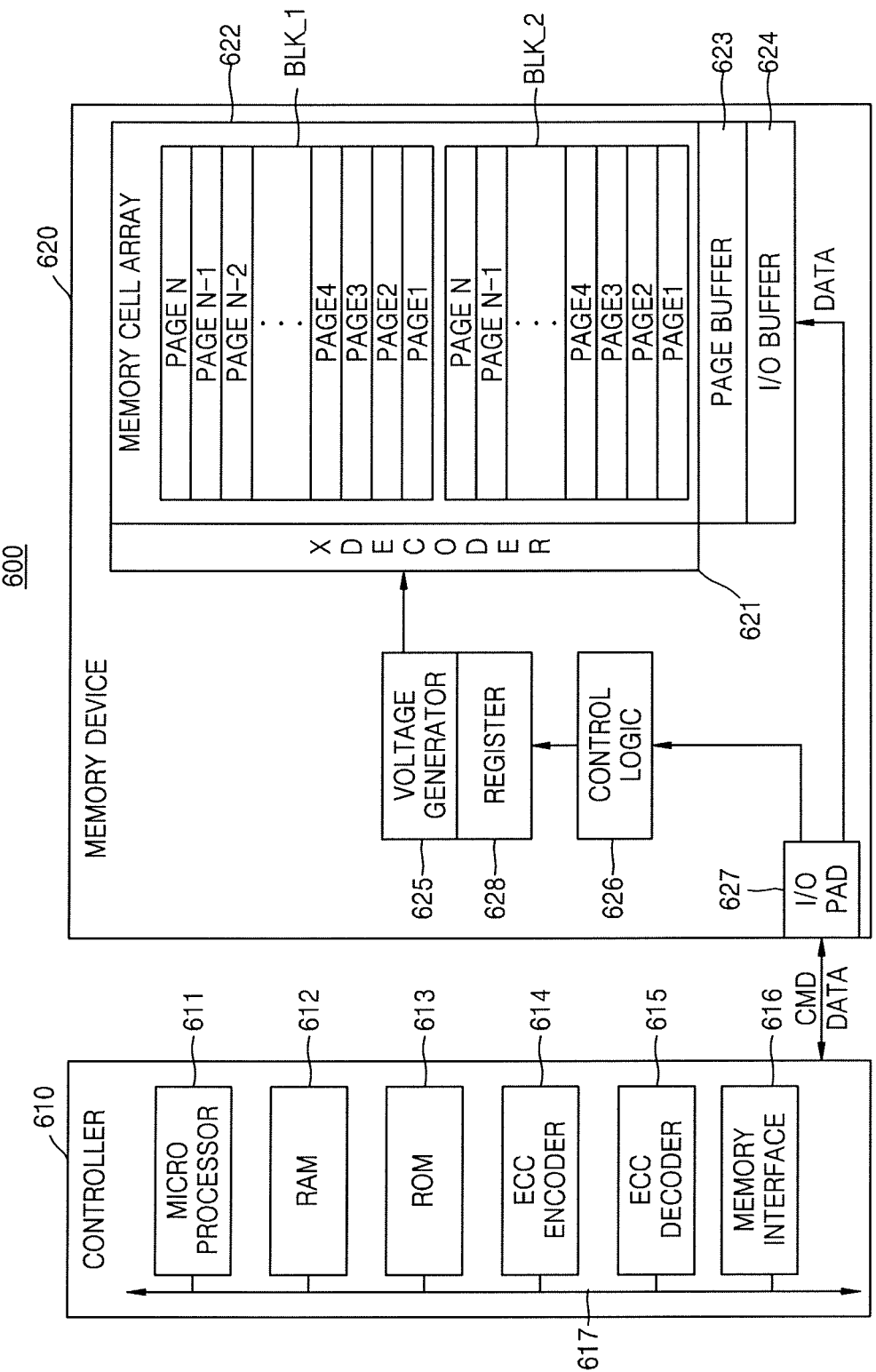
FIG. 9 is a block diagram of a memory system according to an exemplary embodiment of the inventive concept.

FIG. 9 is a block diagram of a memory system 600 according to an exemplary embodiment of the inventive concept.

Referring to FIG. 9, the memory system 600 includes a controller 610 and a non-volatile memory device 620. A NAND flash memory device is exemplified as the non-volatile memory device 620. However, the non-volatile memory device 620 is not limited thereto and the non-volatile memory device 620 may include a plurality of NAND flash memory devices. The non-volatile memory device 620 includes a flat memory cell structure and a three-dimensionally stacked memory cell structure.

The non-volatile memory device 620 includes a memory cell array 622, an X-decoder 621, a voltage generating circuit 625, an input/output pad 627, an input/output buffer 624, a page buffer 623, and a control logic 626.

The memory cell array 622 includes a plurality of word lines W/L and a plurality of bit lines B/L, and each memory cell may store 1-bit data or M-bits (multi-bit) data (M is a natural number that is the same as or larger than 2). Each memory cell may be realized as a memory cell having a charge storage layer, such as a floating gate or a charge trap layer, or a memory cell having a variable resistance device.

The memory cell array 622 may include a plurality of blocks and a plurality of pages. One block includes a plurality of pages. The page may be a unit during a programming operation and a reading operation, and the block may be a unit during an erasing operation. The reading is an operation of reading data programmed in one page.

The memory cell array 622 may be realized as a single-layered array structure or a multi-layered array structure.

The control logic 626 controls general operations of the non-volatile memory device 620. When a command CMD is input from the controller 610, the control logic 626 interprets the command CMD and makes the non-volatile memory device 620 perform operations in correspondence to the interpretation of the command CMD, such as programming, reading, read retrying, and erasing.

The X-decoder 621 is controlled by the control logic 626 and drives at least one word line among the plurality of word lines included in the memory cell array 622 according to a row address.

The voltage generating circuit 625 generates at least one voltage necessary for programming, first reading, second reading, or erasing, according to a control of the control logic 626 and supplies the at least one voltage selected by the X-decoder 621.

A register 628 is storage space for storing information input from the controller 610 and may include a plurality of latches. For example, the register 628 may store read voltage information which is grouped to be arranged in a table format.

The page buffer 623 is controlled by the control logic 626 and operates as a detection amplifier or a light driver, according to an operation mode, for example a read operation or a program operation.

The input/output pad 627 and the input/output buffer 624 may be an input/output path of data which is exchanged between an external device, for example, the controller 610 or the host, and the non-volatile memory device 620.

The controller 610 includes a microprocessor 611, ROM 613, RAM 612, an ECC decoder 615, an ECC encoder 614, a memory interface 616, and a bus 617. The microprocessor 611, the RAM 612, the ROM 613, the ECC encoder 614, the ECC decoder 615, and the memory interface 616 of the controller 610 may be connected with one another via the bus 617.

The microprocessor 611 controls general operations of the memory system 600 including the controller 610. When power is applied to the memory system 600, the microprocessor 611 drives firmware for an operation of the memory system 600, stored in the ROM 613, via the RAM 612 to control the general operations of the memory system 600.

The microprocessor 611 may include the determination unit DET of FIG. 1. Thus, the microprocessor 611 may determine whether to continue performing background garbage collection according to a lifespan index of the memory cell array 622, thereby guaranteeing a predetermined lifespan while performing background garbage collection. The microprocessor 611 may operate by the firmware FW of FIG. 7. Thus, the microprocessor 611 may determine whether to end various background operations performed in the non-volatile memory device 620, according to whether a control command received from the host requires a quick processing.

In FIG. 9, a driving firmware code of the memory system 600 is stored in the ROM 613. However, it is not limited thereto, and the firmware code may be stored in various non-volatile memory devices 620 in addition to the ROM 613. Thus, a control or an intervention of the microprocessor 611 may include not only a direct control of the microprocessor 611 but also an intervention of firmware, which is software driven by the microprocessor 611.

The RAM 612 is memory playing a role of a buffer and may store an initial command, data, and types of variables input from the host, or data output from the non-volatile memory device 620. The RAM 612 may store data, every parameter, and variable input and output to and from the non-volatile memory device 620.

The memory interface 616 may act as an interface between the controller 610 and the non-volatile memory device 620. The memory interface 616 is connected with the I/O pad 627 of the non-volatile memory device 620 and may exchange data with the I/O pad 627. Also, the memory interface 616 may generate a command suitable for non-volatile memories and provide the command suitable for the non-volatile memory device 620 to the I/O pad 627. The memory interface 616 provides a command that is to be performed by the non-volatile memory device 620 and an address ADD of the non-volatile memory device 620.

The ECC decoder 615 and the ECC encoder 614 perform error bit correction. The ECC encoder 614 performs error-correction encoding of data provided to the non-volatile memory device 620 to generate data in which parity bits are added. The parity bits may be stored in the non-volatile memory device 620.

Figure 10A:
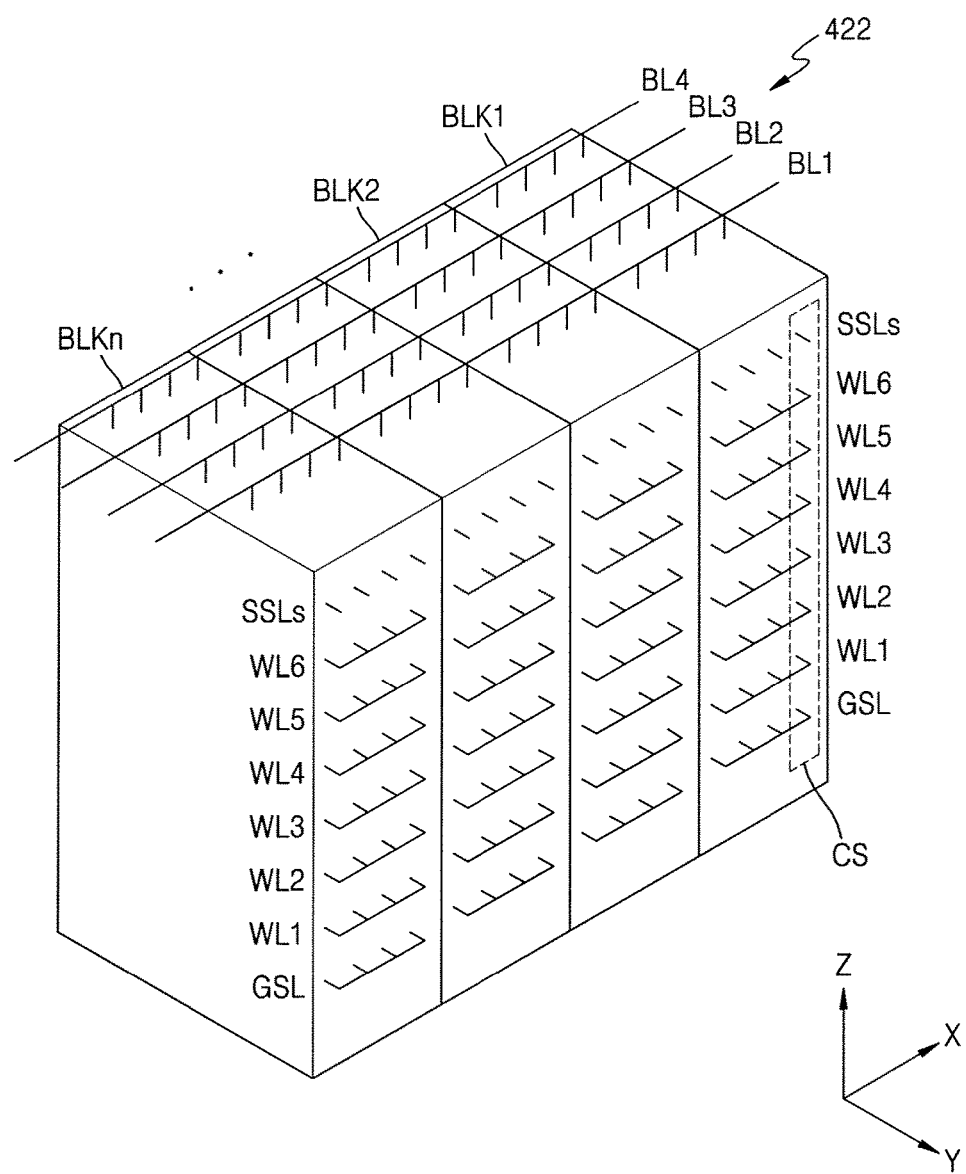
FIGS. 10A through 10C are views of memory cell arrays of FIGS. 1 and 7.
Figure 10B:
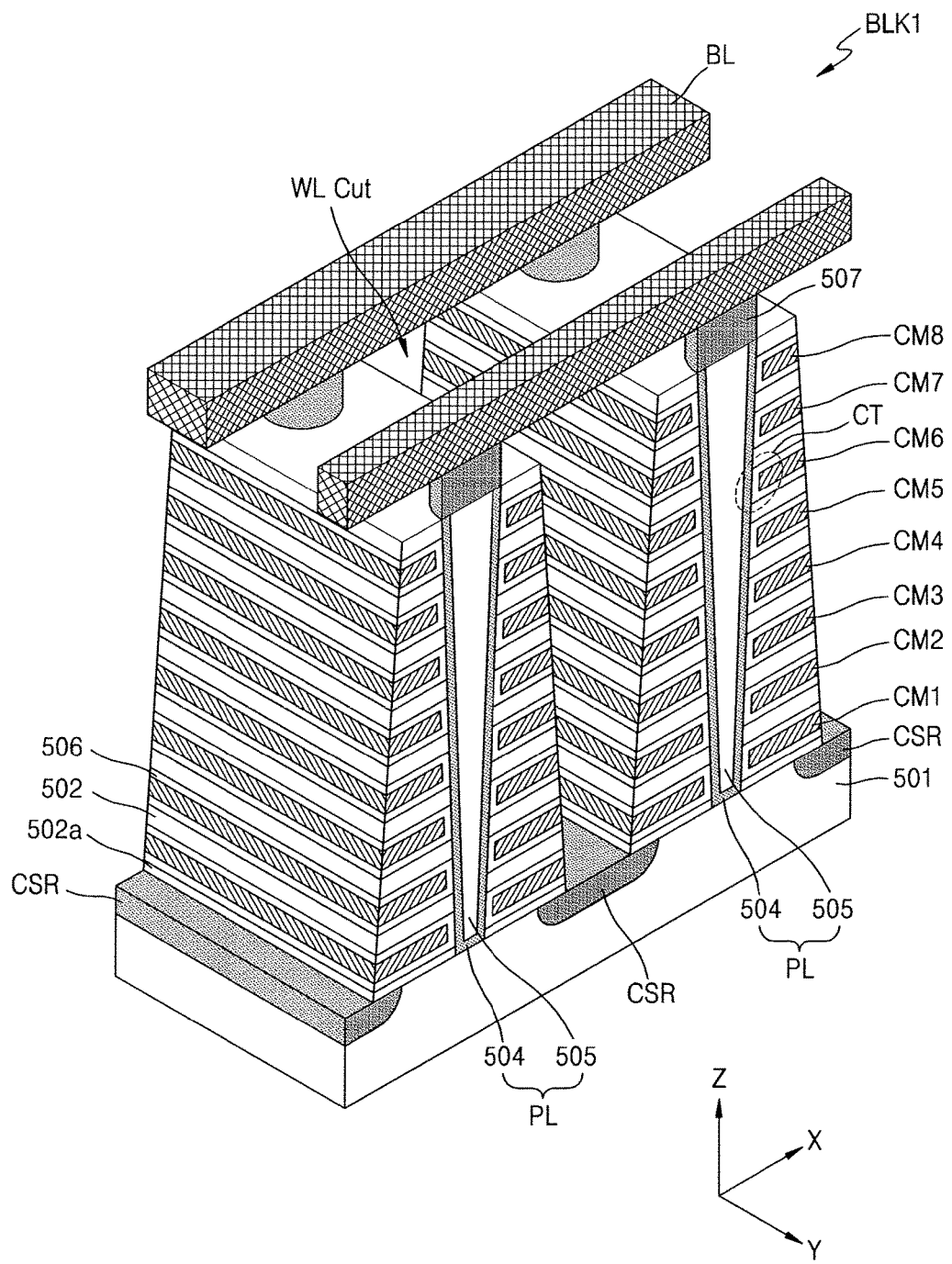
Figure 10C:
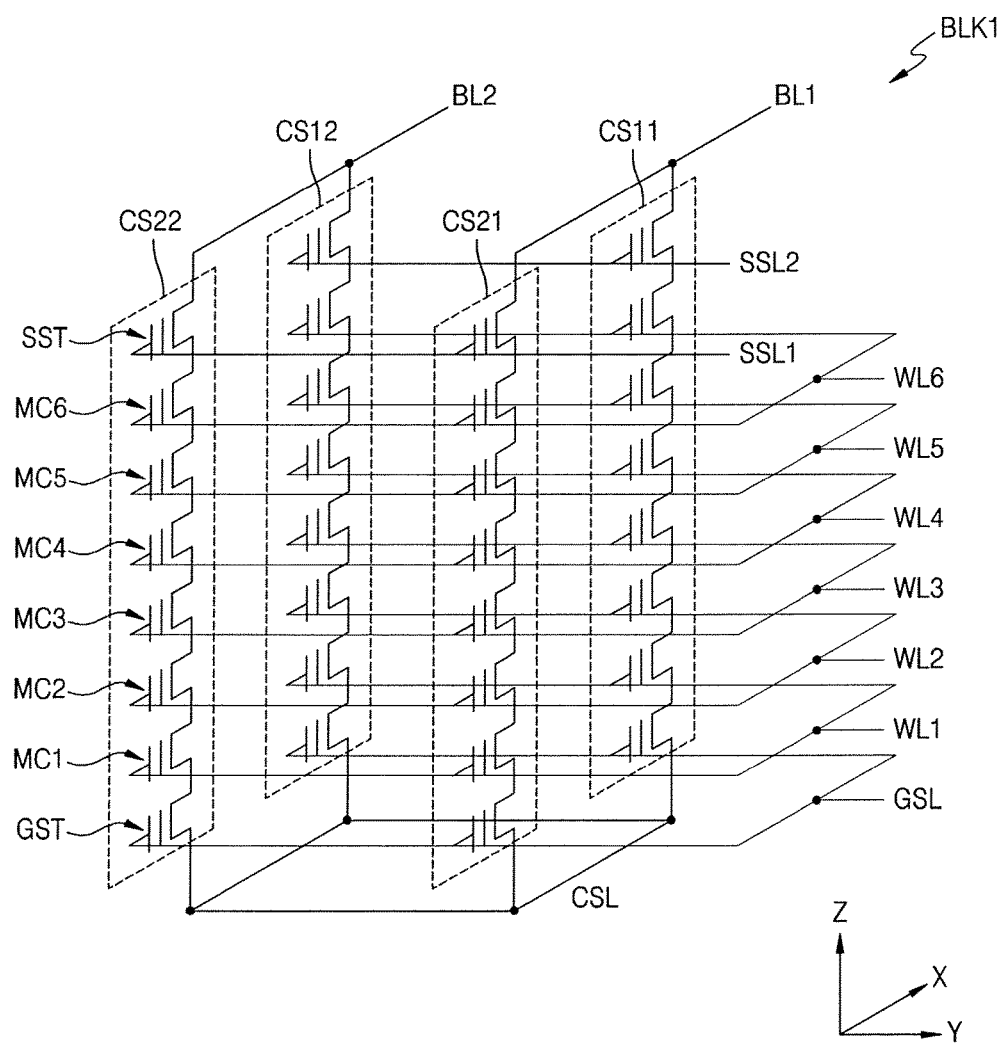

FIGS. 10A through 10C are views illustrating the memory cell arrays 110 and 210 of FIGS. 1 and 7.

Referring to FIG. 10A, the memory cell arrays 110 and 210 of FIGS. 1 and 7 may be arranged like the memory cell array 622. The memory cell array 622 includes a plurality of memory blocks BLK1-BLKn. Each memory block BLK1-BLKn has a three dimensional structure (or a vertical structure). For example, each memory block BLK1-BLKn may include structures extending along first through third directions X, Y, and Z. Each memory block BLK1-BLKn may include a plurality of cell strings CSs extending along the third direction Z. The plurality of cell strings CSs may be separate from one another along the first direction X and the second direction Y.

FIG. 10B is a perspective cross-sectional view of a portion of the first memory block BLK1.

Referring to FIG. 10B, the three-dimensional structure extending along the first through third directions X, Y, and Z is provided. A substrate 501 is provided. For example, the substrate 501 may be a well having a first conductivity type. The substrate 501 may be a well of a p-conductivity type. A plurality of common source regions CSRs extending along the second direction Y and are separate from one another along the first direction X are provided in the substrate 501. In an exemplary embodiment, the plurality of common source regions CSRs are connected to one another and form a common source line CSL. The plurality of common source regions CSRs have a second conductivity type which is different from the first conductivity type of the substrate 701. For example, the plurality of common source regions CSRs may have an n-conductivity type.

A plurality of insulating materials 502a and 502 are sequentially provided on the substrate 501 along the third direction Z, which is a direction vertical to the substrate 501, between two adjacent plurality of common source regions CSRs. The plurality of insulating materials 502a and 502 are separate from one another along the third direction Z and extend along the second direction Y. The plurality of insulating materials 502a and 502 may include an insulating material, such as a semiconductor oxide layer. Of the insulating materials 502a and 502, a thickness of the insulating material 502a, which contacts the substrate 501, may be less than that of the insulating material 502.

A plurality of pillars PLs are provided between every two adjacent common source regions CSRs, wherein the plurality of pillars PLs are separate from one another along the first direction X and penetrate the plurality of insulating materials 502a and 502 along the third direction Z. The plurality of pillars PLs may penetrate the insulating materials 502a and 502 to contact the substrate 501. The plurality of pillars PLs may include channel layers 504 and inner materials 505 inside the channel layers 504. The channel layers 504 may include a semiconductor material (for example, silicon) having the first conductivity type, which is the conductivity type of the substrate 501. The inner materials 505 may include an insulating material, such as a silicon oxide layer.

Information storage layers 506 are provided on exposed surfaces of the insulating materials 502a and 502 and the pillars PLs, between every two adjacent common source regions CSRs. The information storage layers 506 may store information by capturing or spilling charges.

Conductive materials CM1-CM8 are provided on exposed surfaces of the information storage layers 506, between every two adjacent common source regions CSRs and between the insulating materials 502 and 502. The conductive materials CM1-CM8 may extend along the second direction Y. The conductive materials CM1-CM8 may be separated by a word line cut WL_cut with respect to the common source regions CSRs. In an exemplary embodiment, the word line cut WL_cut extends along the second direction Y and exposes the common source regions CSRs. The conductive materials CM1-CM8 may include a metal conductive material. The conductive materials CM1-CM8 may include a non-metallic conductive material, such as polysilicon. The conductive materials CM1-CM8 may have first through eighth heights in this order from the substrate 501.

A plurality of drains 507 are provided on the plurality of pillars PLs. The drains 507 may include a semiconductor material (for example, silicon) having a second conductivity type. The drains 507 may extend from upper portions of the channel layers 504 of the pillars PLs. Bit lines BLs are provided on the drains 507, wherein the bit lines BLs extend along the first direction X and are separated from one another along the second direction Y. The bit lines BLs are connected with the drains 507. For example, the drains 507 and the bit lines BLs may be connected via contact plugs. The bit lines BLs may include a metal conductive material. The bit lines BLs may include a non-metallic conductive material such as polysilicon.

The plurality of pillars PLs, the information storage layers 506, and the plurality of conductive materials CM1-CM8 form a plurality of cell strings. Each cell string forms a cell transistor CT stacked in a direction vertical to the substrate 501. The cell transistors CTs are formed of the conductive materials CM1-CM8, the pillars PLs, and the information storage layers 506 provided between the conductive materials CM1-CM8 and the pillars PLs.

The conductive materials CM1-CM8 operate as gates (or control gates) of the cell transistors CTs. For example, the first conductive material CM1, the information storage layers 506, and the pillars PLs may form ground selection transistors GSTs. The first conductive material CM1 may form a ground selection line GSL which is connected in common. The second through seventh conductive materials CM2-CM7, the information storage layers 506, and the pillars PLs form first through sixth memory cells MC1-MC6. The second through seventh conductive materials CM2-CM7 may form first through sixth word lines WL1-WL6. The eighth conductive material CM8, the information storage layers 506, and the pillars PLs may form string selection transistors SSTs. The eighth conductive material CM8 may form string selection lines SSL1 and SSL2.

FIG. 10C illustrates an equivalent circuit of a portion of the first memory block BLK1 of FIG. 10A.

Referring to FIG. 10C, cell strings CS11, CS12, CS21, and CS22 are provided between bit lines BL1 and BL2 and the common source line CSL. The cell strings CS11, CS12, CS21, and CS22 may each include a string selection transistor SST connected with a string selection line SSL, the plurality of memory cells MC1-MC6 respectively connected with the plurality of word lines WL1-WL6, and the ground selection transistor GST connected with the ground selection line GSL.

Memory cells of the same height are commonly connected with a word line. Thus, when a voltage is applied to a word line of a specific height, the voltage is applied to all cell strings CS11, CS12, CS21, and CS22.

The cell strings CS11, CS12, CS21, and CS22 of different rows are connected with different strings selection lines SSL1 and SSL2. By selecting and non-selecting the first and second string selection lines SSL1 and SSL2, the cell strings CS11, CS12, CS21, and CS22 may be selected and non-selected by a row unit.

The cell strings CS11, CS12, CS21, and CS22 are connected with the bit lines BL1 and BL2 by a column unit. The cell strings CS11 and CS21 are connected between the bit line BL1 and the common source line CSL, and the cell strings CS12 and CS22 are connected between the bit line BL2 and the common source line CSL. By selecting and non-selecting the bit lines BL1 and BL2, the cell strings CS11, CS12, CS21, and CS22 may be selected and non-selected by the column unit.

An erasing operation is performed to make memory cells have a predetermined negative threshold voltage, in order to write data in the plurality of memory cells MC1-MC6. The erasing operation is performed in a block unit BLK1-BLKn. Then, a programming operation with respect to a selected memory cell is performed by applying a high voltage Vpgm to a word line connected with the selected memory cell for a predetermined time period.

Figure 11:
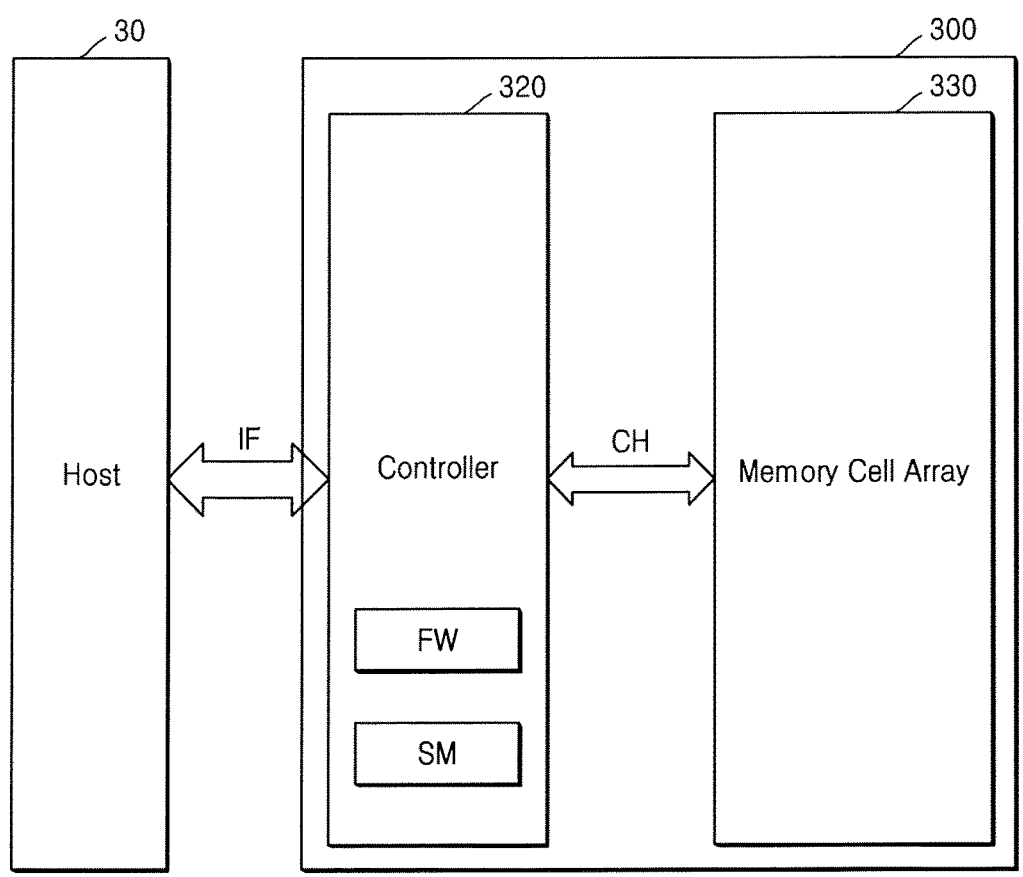
FIG. 11 is a diagram of a structure of a memory system using methods of controlling a memory system, according to exemplary embodiments of the inventive concept.

FIG. 11 is a diagram of a structure of a memory system 300 using methods of controlling a memory system, according to exemplary embodiments of the inventive concept.

Referring to FIG. 11, the memory system 300 includes a controller 320 and a memory device 330. The controller 320 may be configured to control the memory device 330. The memory system 300 may be mounted on mobile devices, such as cellular phones (e.g., smartphones) and tablet PCs. The structure of the memory device 330 may be similar to that of the memory device 130 of FIG. 1.

The controller 320 may include a storage manager SM. That is, the storage manager SM according to the present exemplary embodiment may be included in the controller 320 unlike the embodiment of FIG. 1.

The storage manager SM may manage information about whether a control command CTRL CMD issued from a host 30 requires a quick processing. The storage manager SM may determine whether the control command CTRL CMD issued from the host 30 requires the quick processing.

When there is no input to the host 30 for a predetermined time, the storage manager SM may determine that the command transmitted to the controller 320 does not require the_quick processing. The storage manager SM may determine that the command transmitted to the controller 320 does not require the quick processing, when a screen of a display device (not shown) including the memory system 300 is off for a predetermined time.

Figure 12:
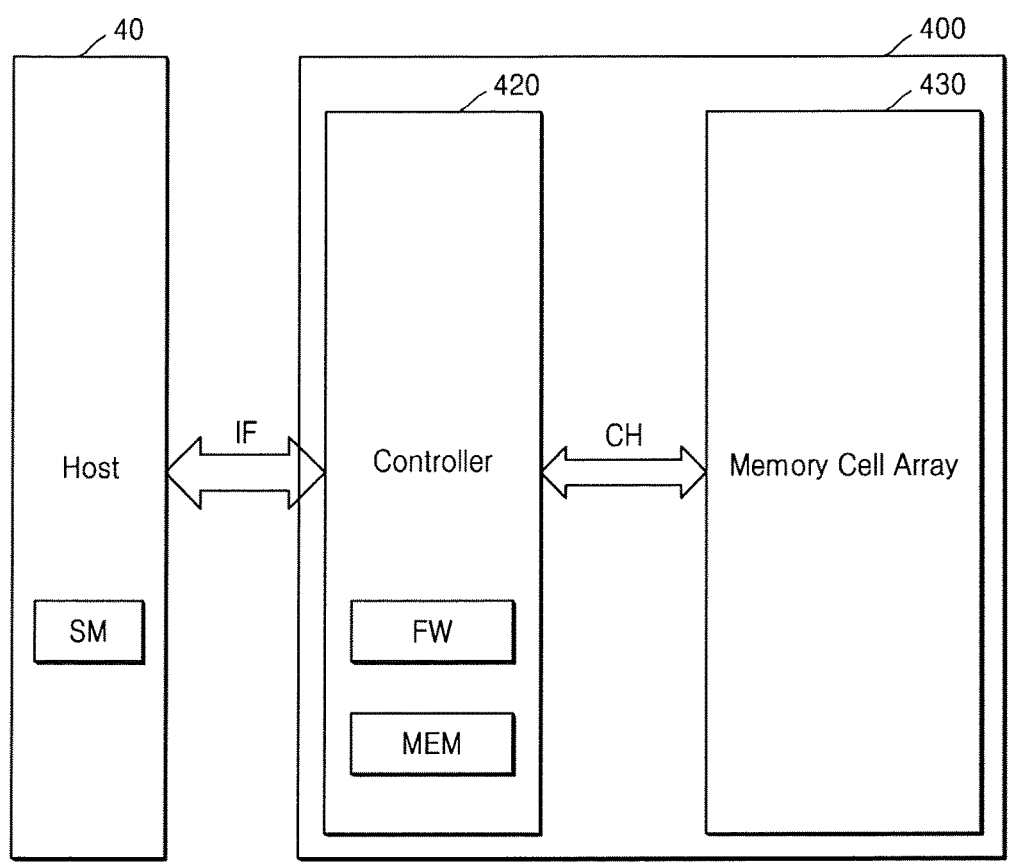
FIG. 12 is a diagram of a structure of a memory system using methods of controlling a memory system, according to exemplary embodiments of the inventive concept.

FIG. 12 is a diagram of a structure of a memory system 400 using methods of controlling a memory system, according to exemplary embodiments of the inventive concept.

Referring to FIG. 12, the memory system 400 includes a controller 420 and a memory device 430. The controller 420 may be configured to control the memory device 430. The memory system 400 may be mounted on mobile devices, such as cellular phones (e.g., smartphones) and tablet PCs.

The structure of the memory device 430 may be similar to that of the memory device 130 of FIG. 1.

A host 40 according to the present exemplary embodiment includes a storage manager SM. The storage manager SM may determine whether a control command CTRL CMD issued from the host 40 requires a quick processing.

The controller 420 may include memory MEM to store information about whether the control command CTRL CMD issued from the host 40 requires the quick processing. The controller 420 may receive the information about whether the control command CTRL CMD issued from the host 40 requires the quick processing, from the host 40, and may store the information in the memory MEM.

Figure 13:
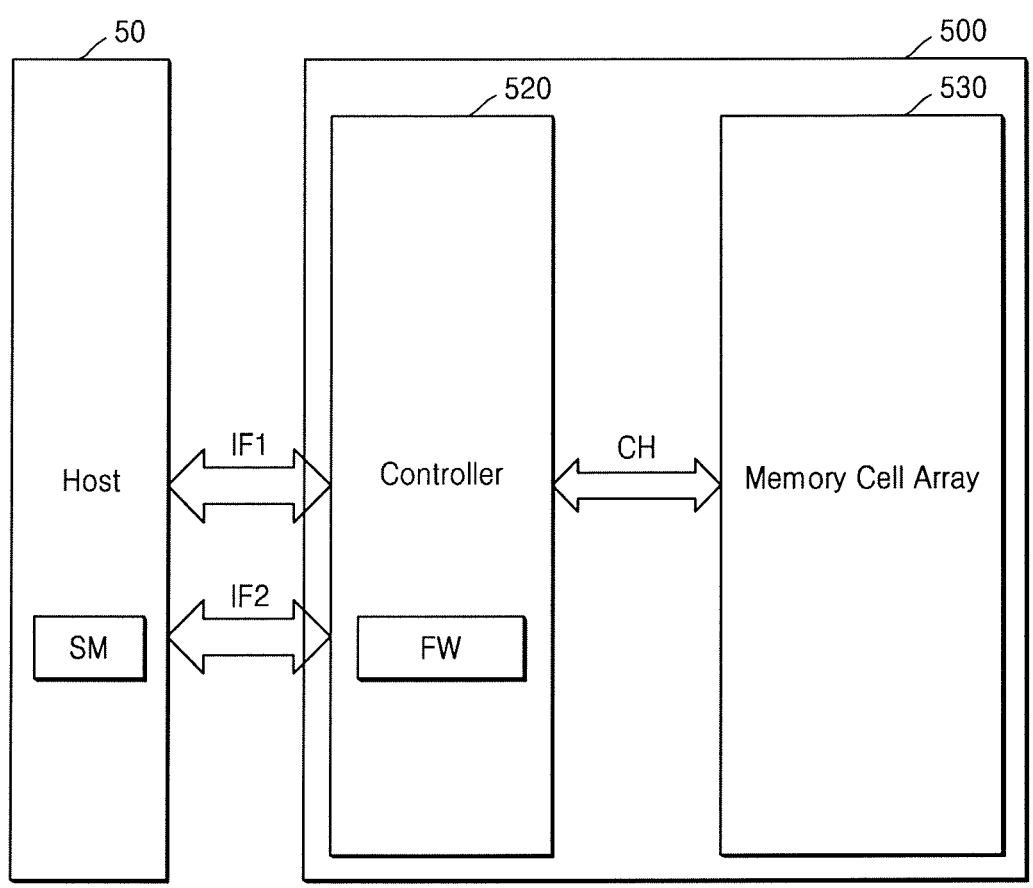
FIG. 13 is a diagram of a structure of a memory system using methods of controlling a memory system, according to exemplary embodiments of the inventive concept.

FIG. 13 is view of a structure of a memory system 500 using methods of controlling a memory system, according to exemplary embodiments of the inventive concept.

Referring to FIG. 13, the memory system 500 includes a controller 520 and a memory device 530. The controller 520 may be configured to control the memory device 530. The memory system 500 may be mounted on mobile devices, such as cellular phones (e.g., smartphones) and tablet PCs.

A host 50 according to the present exemplary embodiment includes a storage manager SM. The storage manager SM may manage information about whether a control command CTRL CMD issued from the host 50 requires a quick processing. The storage manager SM may transmit the information about whether the control command requires the quick processing via a second interface IF2 that connects the memory device 530 and the host 50.

Figure 14:
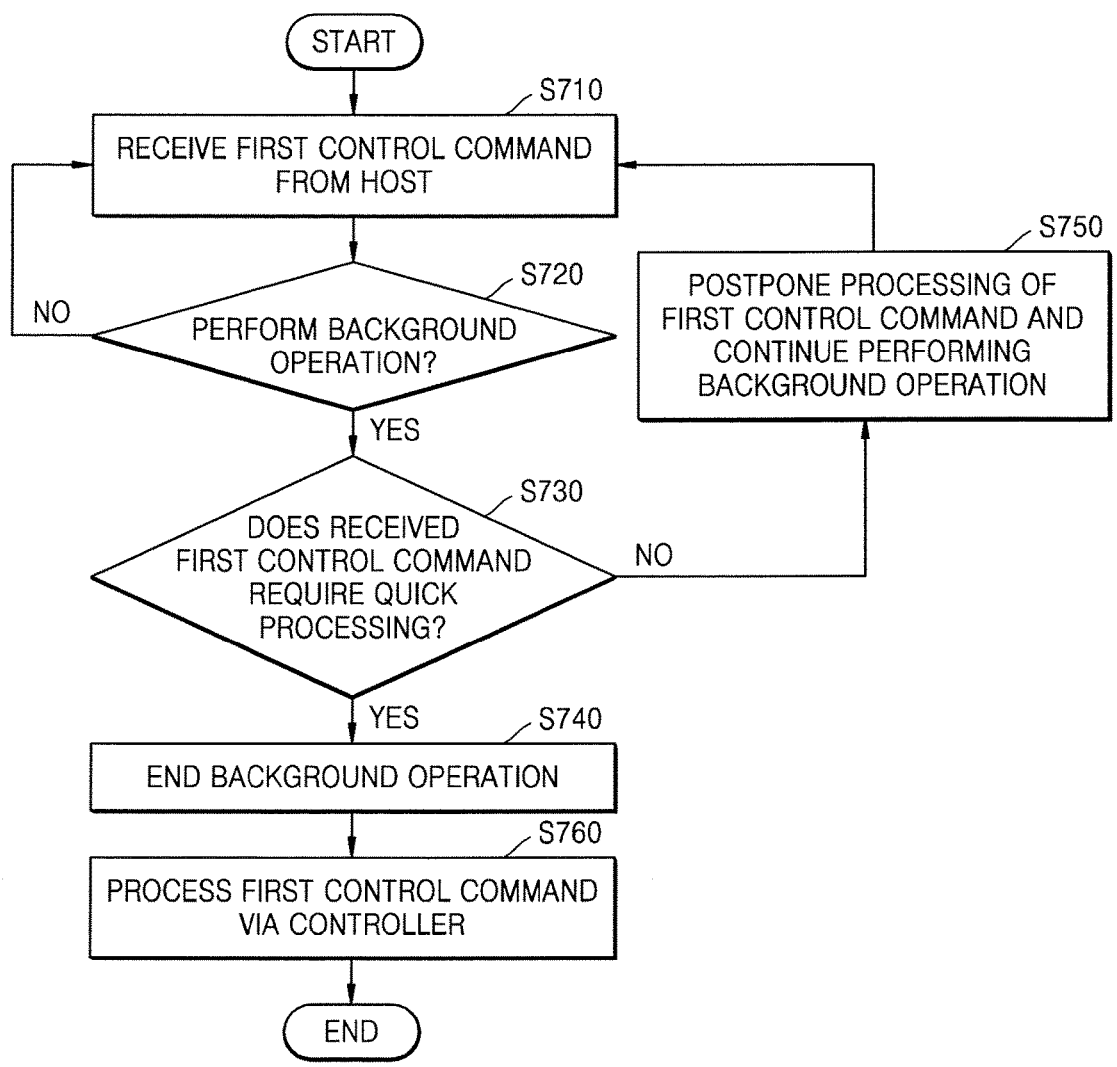
FIG. 14 is a flowchart of an operation of a memory system, according to an exemplary embodiment of the inventive concept.

FIG. 14 is a flowchart of an operation of the memory system 200 according to exemplary embodiment of the inventive concept.

Referring to FIG. 14 and FIG. 7, the controller 220 receives a first control command (for example, a read command) from the host 20, in operation S710. When receiving the first control command (for example, the read command), the controller 220 determines whether the controller 220 performs at least one background operation, in operation S720. For example, the controller 220 may determine whether background garbage collection, read reclaim, or erasing is performed. When the controller 220 performs the at least one background operation, the controller 220 determines whether the first control command received by the controller 220 requires a quick processing, in operation S730.

If the first control command received by the controller 220 requires the quick processing, the controller 220 ends an on-going background operation in operation S740. Otherwise, if the first control command received by the controller 220 does not require the quick processing, the controller 220 postpones processing of the first control command and continues performing the background operation, in operation S750.

When the background operation has completed, the controller 220 may perform the postponed processing of the first control command, in operation S760.

For example, when the background operation has completed, the controller 220 may determine whether to further perform another background operation. If there is no need to perform another background operation, the controller 220 may perform the postponed processing of the first control command. For example, when the background operation has completed, the controller 220 may perform operations with respect to the first control command through an $n^{th}$ control command, which are postponed while performing the background operation. For example, when the background operation has completed, the controller 220 may perform the operations with respect to the first control command through the $n^{th}$ control command, which are postponed while performing the background operation, according to a priority order.

Figure 15:
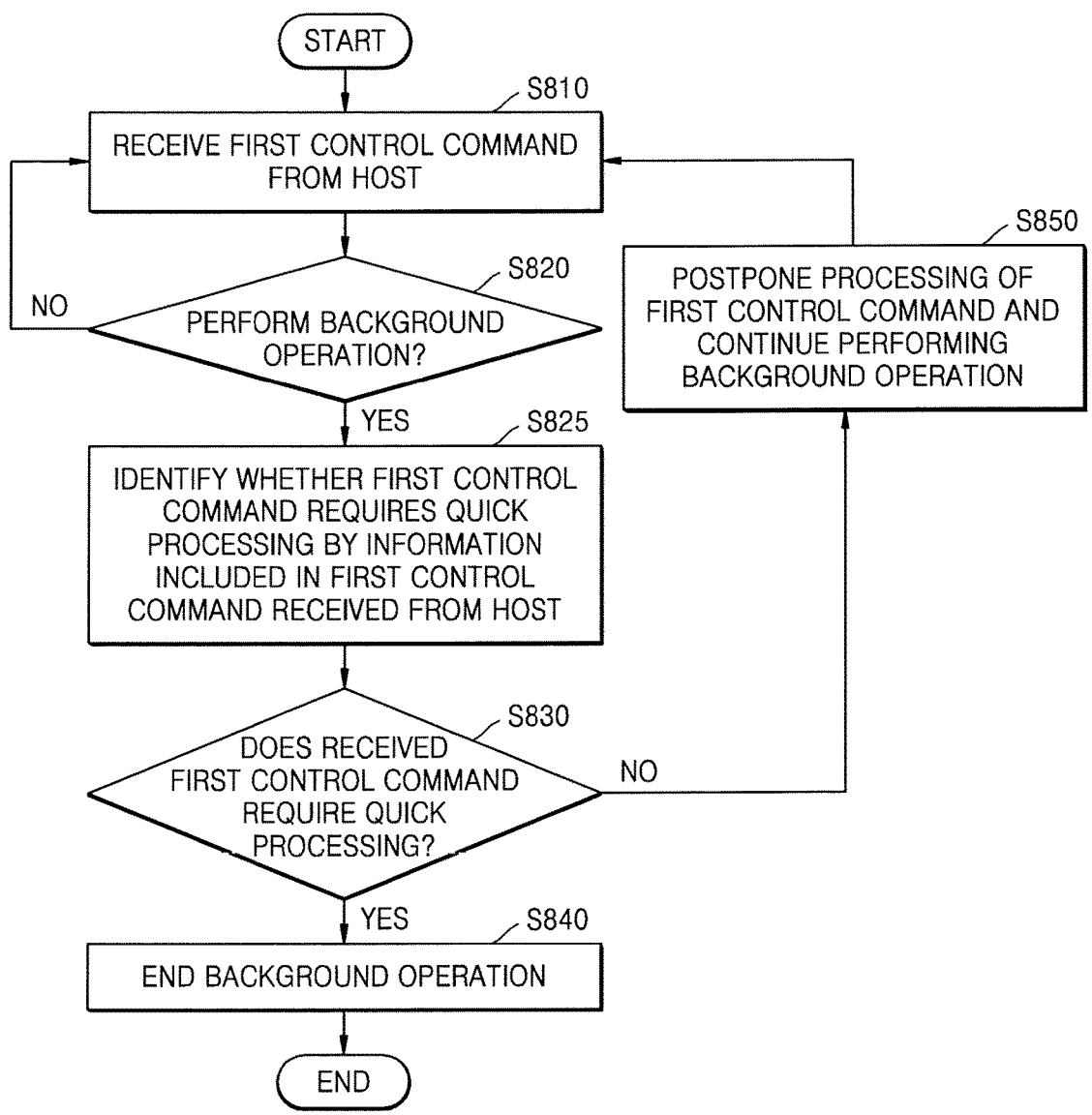
FIG. 15 is a flowchart of an operation of a memory system, according to an exemplary embodiment of the inventive concept.

FIG. 15 is a flowchart of an operation of the memory system 200 according to exemplary embodiment of the inventive concept.

Referring to FIG. 15 and FIG. 7, the controller 220 receives a first control command (for example, a read command) from the host 20, in operation S810. When receiving the first control command (for example, the read command), the controller 220 determines whether the controller 220 performs at least one background operation, in operation S820. For example, the controller 220 may determine whether the controller 220 performs background garbage collection, read reclaim, or erasing.

When the controller 220 performs at least one background operation, the controller 220 analyzes information included in the first control command received from the host 20 in operation S825 to determine whether the first control command requires a quick processing in operation S830.

For example, the controller 220 may determine whether the first control command requires the quick processing, according to a bit signal of the first control command received by the controller 220. For example, the controller 220 may determine whether the first control command requires the quick processing according to encoded data of the first control command received by the controller 220. For example, the controller 220 may determine whether the first control command requires the quick processing according to an arrangement of at least one predetermined bit signal of the first control command received by the controller 220.

If the first control command received by the controller 220 requires the quick processing, the controller 220 ends the on-going background operation in operation S840. Otherwise, if the first control command received by the controller 220 does not require the quick processing, the controller 220 postpones processing of the first control command and continues performing the background operation, in operation S850.

Figure 16:
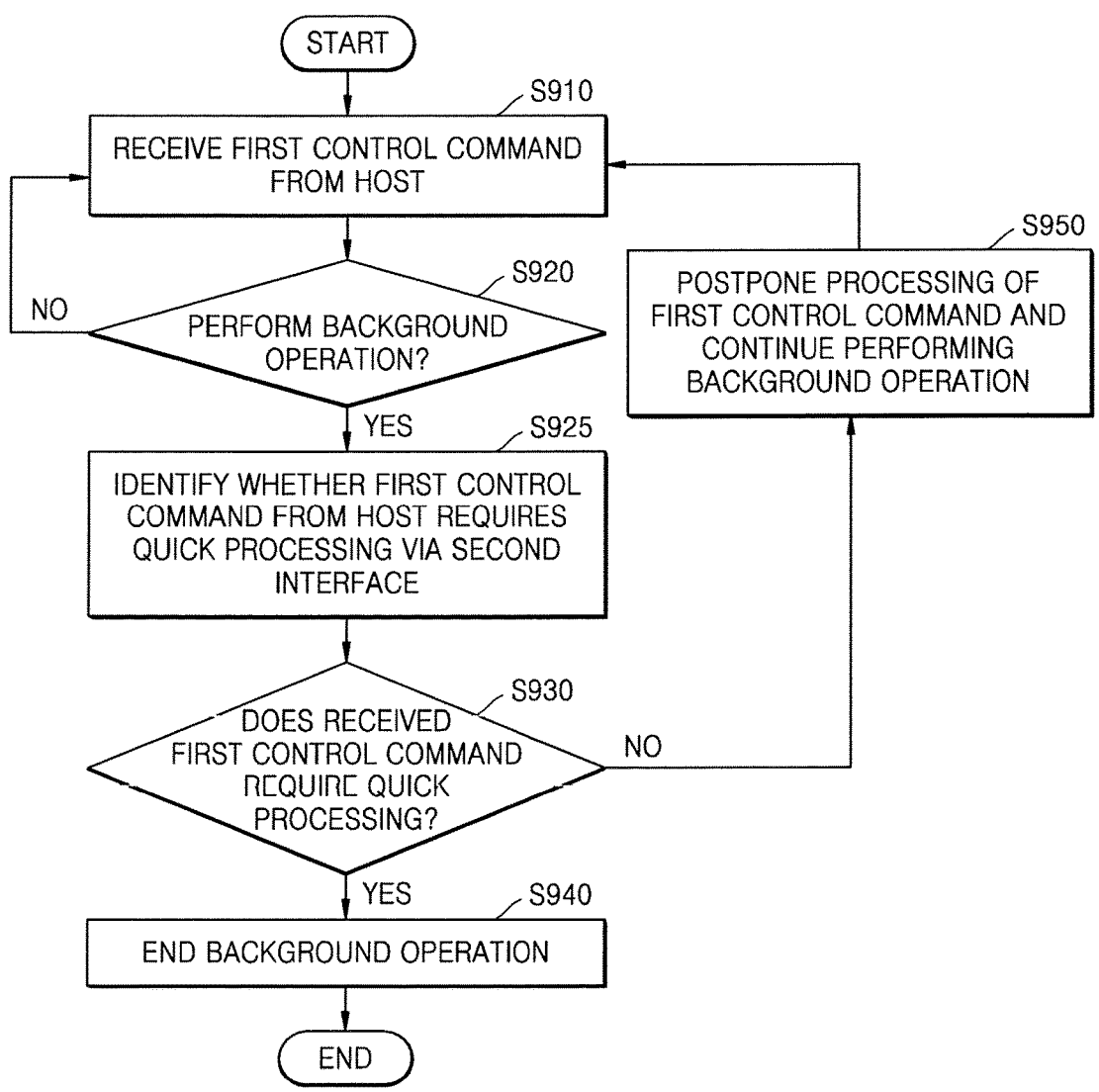
FIG. 16 is a flowchart of an operation of a memory system, according to an exemplary embodiment of the inventive concept.

FIG. 16 is a flowchart of an operation of a memory system 500 according to exemplary embodiment of the inventive concept.

Referring to FIG. 16 and FIG. 13, the controller 520 receives a first control command (for example, a read command) via an interface (e.g., IF1) from a host 50 in operation S910. When receiving the first control command (for example, the read command), the controller 520 determines whether the controller 520 performs at least one background operation, in operation S920. For example, the controller 520 determines whether background garbage collection, read reclaim, or erasing is performed.

When the controller 520 performs at least one background operation, the controller 520 analyzes information received via an interface IF1 that received the first control command and information received via a second interface IF2, in operation S925, to determine whether the first control command requires a quick processing in operation S930.

If the first control command received by the controller 520 requires the quick processing, the controller 520 ends the on-going background operation, in operation S940. Otherwise, if the first control command received by the controller 520 does not require the quick processing, the controller 520 postpones processing of the first control command and continues performing the background operation, in operation S950.

Figure 17:
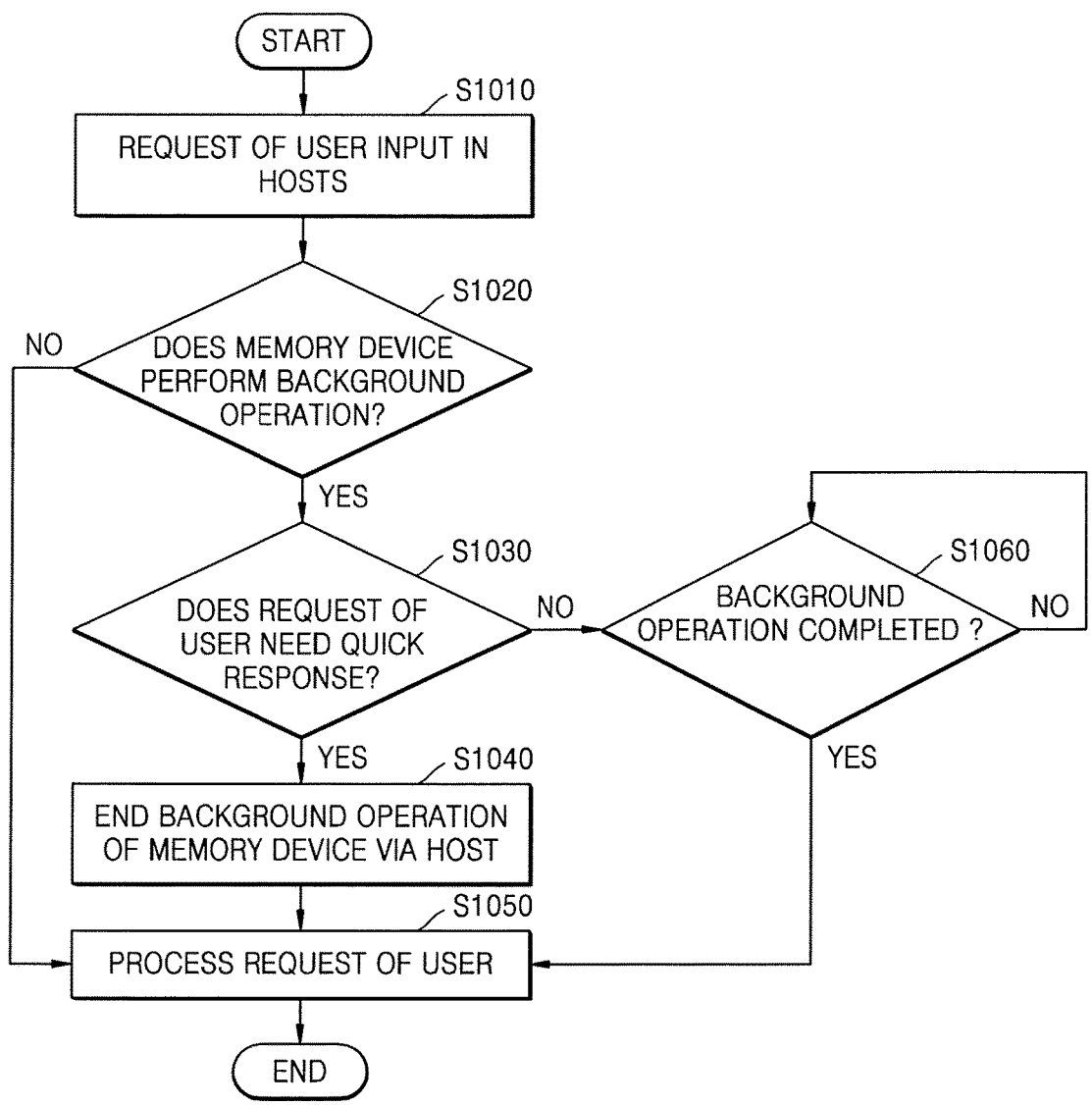
FIG. 17 is a flowchart of an operation of a memory system, according to an exemplary embodiment of the inventive concept.

FIG. 17 is a flowchart of an operation of the memory system 200 according to exemplary embodiment of the inventive concept.

Referring to FIG. 17 and FIG. 7, when there is a request by a user in the host 20 in operation S1010, the memory device 230 determines whether at least one background operation is performed in operation S1020. For example, the controller 220 may determine whether the memory device 230 performs background garbage collection, read reclaim, erasing, or memory cell status checks.

When the memory device 230 performs at least one background operation, the controller 220 determines whether the request by the user in the host 20 requires a quick response, in operation S1030. For example, the memory device 230 may transmit information about whether the memory device 230 performs the background operation to the storage manager SM of the host 20. For example, the memory device 230 may transmit information about which background operation the memory device 230 performs to the storage manager SM of the host 20. This information may be stored in memories included in the storage manager SM.

If the request by the user in the host 20 does not require the quick response in operation S1030, the controller 220 continues to perform the background operation. When it has been determined that the background operation has completed in operation 1060, the memory device 230 processes the request by the user in operation S1050. For example, when there is no input to the host for a predetermined time, the storage manager SM may determine that the command transmitted to the controller 220 does not require a quick processing. When a screen of a display device (not shown), including the memory system 200, is off for a predetermined time, the storage manager SM may determine that the command transmitted to the controller 220 does not require the quick processing. For example, the screen may be a touch screen of a mobile device such as a smartphone.

If the request by the user in the host 20 requires the quick response, the host 20 ends the background operation of the memory device 230, in operation S1040, and processes the request by the user in operation S1050. If the request by the user in the host 20 requires the quick response, the host 20 may determine how fast the request by the user needs to be processed.

Figure 18:
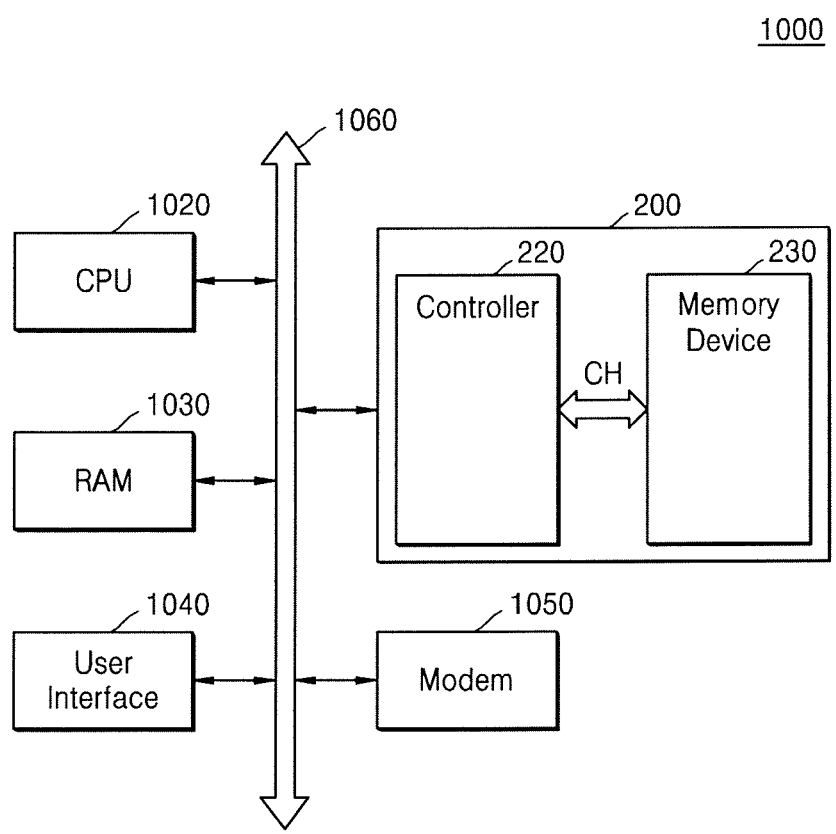
FIG. 18 is a view of a computing system implementing methods of controlling a flash memory system, according to exemplary embodiments of the inventive concept.

FIG. 18 is a view illustrating a computing system 1000 implementing methods of controlling a flash memory, according to exemplary embodiments of the inventive concept.

Referring to FIG. 18, the computing system 1000 includes a CPU or microprocessor 1020, RAM 1030, a user interface 1040, a modem 1050 such as a baseband chipset, and the memory system 200, which are electrically connected to a system bus 1060.

The memory system 200 may include the controller 220 and the memory device 230. The controller 220 may connect the microprocessor 1020 and the memory device 230 via the system bus 1060. The controller 220 may provide an interface with the memory device 230 in correspondence to a bus format of the microprocessor 1020. The memory system 200 may form a solid state disk (SSD). In this case, the controller 220 may be configured to communicate with the outside (for example, a host) via one selected from various interface protocols, such as USB, MMC, PCI-E, SAS, SATA, PATA, SCSI, ESDI, and IDE.

The structure of the controller 220 may be the same as the controller 120 of FIG. 1. Also, the controller 220 may apply the methods of controlling a memory system, according to the exemplary embodiments of the inventive concept. The structure of the memory device 230 may be the same as that of the memory system 100 of FIG. 1.

The controller 220 may determine whether to end background garbage collection according to a lifespan index of at least one data block. The controller 220 may continually calculate the remaining lifespan index of the at least one data block. Also, the controller 220 may calculate the lifespan index which is to be decreased per iteration of the background garbage collection. Also, the controller 220 may determine the lifespan index (the first reference value) which is allowed to be decreased by the background garbage collection, by considering the total lifespan index and the remaining lifespan index per iteration of the background garbage collection.

The controller 220 may include the determination unit DET and determine whether to end the background garbage collection per iteration, according to the lifespan index of the data blocks. The determination unit DET may determine whether the remaining lifespan index of the data blocks is greater than the lifespan index (the first reference value) which is allowed to be decreased by the background garbage collection and determine whether to end the background garbage collection, per iteration.

For example, the determination unit DET may enable the controller 720 to end the background garbage collection, when the remaining lifespan index of the data blocks is smaller than the lifespan index (the first reference value) which is allowed to be decreased by the background garbage collection.

The controller 220 may receive from the host 20 the lifespan index (the first reference value) which is allowed to be decreased by the background garbage collection, per iteration.

The controller 220 may calculate the lifespan index (the first reference value) which is allowed to be decreased by the background garbage collection by the firmware FW, per iteration.

The microprocessor 1020 or the controller 220 may include the storage manager SM. The storage manager SM may manage information about whether a control command CTRL CMD issued from the host 20 requires a quick processing. The storage manager SM may determine whether the control command CTRL CMD issued from the host 20 requires a quick processing.

The storage manager SM may include the information about whether the first control command requires the quick processing in the first control command and transmit the information to the controller 220. The storage manager SM may transmit the information about whether the first control command requires the quick processing via an interface which connects the memory device and the host 20.

The storage manager SM may determine that the command transmitted to the controller does not require the quick processing, when there is no input to the host 20 for a predetermined time. The storage manager SM may determine that the command transmitted to the controller does not require the quick processing, when a screen of a display device (not shown), including the memory system 200, is off for a predetermined time.

When the computing system 1000 is a mobile device, a battery for supplying an operation voltage of the computing system 1000 is further provided. Also, the computing system 100 may further include an application chipset, a camera image processor (CIS), and mobile DRAM.

The controller 220 and/or the memory device 230 may be mounted by using various forms of packages. For example, the controller 220 and/or the memory device 230 may be mounted by using the packages, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline (TSOP), thin quad flat pack (TQFP), system in package (SIP), multi-chip package (MCP), wafer-level fabricated package (WFP), and wafer-level processed stack package (WSP).

While the inventive concept has been particularly shown and described with reference to exemplary embodiments thereof, it will be understood that various changes in form and details may be made therein without departing from the spirit and scope of the disclosure.

What is claimed is:

1. A flash memory system comprising:
a memory device comprising a memory cell array comprising at least one data block; and
a controller that determines whether to end background garbage collection according to a lifespan index of the at least one data block,
wherein the lifespan index indicates a time period during which a normal operation of the flash memory system is guaranteed.

2. The flash memory system of claim 1, wherein the controller ends the background garbage collection when a value of the lifespan index decreased by the background garbage collection is equal to or higher than a first reference value.

3. The flash memory system of claim 2, wherein the plurality of nonvolatile memory cells forms a three-dimensionally stacked memory cell structure.

4. The flash memory system of claim 3, wherein the memory cell memory array comprises $Si_3N_4$ as a charge trap layer.

5. The flash memory system of claim 2, wherein the controller calculates the lifespan index and calculates the first reference value based on the lifespan index.

6. The flash memory system of claim 1, wherein the controller determines the lifespan index based on a programming/erasing count with respect to the at least one data block.

7. The flash memory system of claim 1, wherein the controller determines the lifespan index based on an accumulated amount of data bits programmed into the at least one data block.

8. The flash memory system of claim 1, wherein the controller calculates the lifespan index per iteration of the background garbage collection.

9. The flash memory system of claim 8, wherein the controller outputs the lifespan index calculated per iteration of the background garbage collection to a source located outside the flash memory system.

10. The flash memory system of claim 1, wherein the controller determines whether to end the background garbage collection based on whether a number of free blocks obtained by each iteration is equal to or higher than a second reference value.

11. The flash memory system of claim 1, wherein the controller determines whether to end the background garbage collection based on whether a time taken for each iteration is equal to or higher than a third reference value.

12. A flash memory system comprising:
a memory device comprising a memory cell array comprising at least one data block; and
a controller that determines whether to end background garbage collection according to a remaining lifespan index of the at least one data block,
wherein the controller determines the remaining lifespan index based on a number of times the at least one data block has been programmed, the controller decreases the remaining life span index a certain value each time an iteration of the background garbage collection is performed, and the controller ends the background garbage collection when the decreased remaining life span index is less than or equal to a first reference value.

13. The flash memory system of claim 12, wherein the controller continues the background garbage collection if the decreased remaining lifespan index is greater than the first reference value.

14. The flash memory system of claim 12, wherein the plurality of nonvolatile memory cells forms a three-dimensionally stacked memory cell structure.

15. The flash memory system of claim 12, wherein the controller determines the remaining lifespan index based on a programming/erasing count with respect to the at least one data block.

16. The flash memory system of claim 12, wherein the controller ends the background garbage collection when a number of free blocks obtained by the iteration is equal to or higher than a second reference value regardless of how the decreased remaining lifespan index compares to the first reference value.

17. The flash memory system of claim 12, wherein the controller ends the background garbage collection when a time taken for the iteration is equal to or higher than a second reference value regardless of how the decreased remaining lifespan index compares to the first reference value.

* * * * *